(12) United States Patent
Nomura et al.

(10) Patent No.: US 12,134,118 B2
(45) Date of Patent: Nov. 5, 2024

(54) WORKPIECE TRANSPORT UNIT, HOT PRESSING EQUIPMENT, WORKPIECE TRANSPORT METHOD, AND HOT PRESSING METHOD

(71) Applicant: NIPPON STEEL CORPORATION, Tokyo (JP)

(72) Inventors: Naruhiko Nomura, Tokyo (JP); Toshiya Suzuki, Tokyo (JP); Kenta Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 405 days.

(21) Appl. No.: 17/602,782

(22) PCT Filed: May 29, 2020

(86) PCT No.: PCT/JP2020/021436
§ 371 (c)(1),
(2) Date: Oct. 11, 2021

(87) PCT Pub. No.: WO2020/246396
PCT Pub. Date: Dec. 10, 2020

(65) Prior Publication Data
US 2022/0152685 A1 May 19, 2022

(30) Foreign Application Priority Data
Jun. 4, 2019 (JP) ................. 2019-104321

(51) Int. Cl.
*B25J 15/00* (2006.01)
*B21D 22/20* (2006.01)
(Continued)

(52) U.S. Cl.
CPC ......... *B21D 43/105* (2013.01); *B21D 22/208* (2013.01); *B21D 28/02* (2013.01);
(Continued)

(58) Field of Classification Search
CPC ........ B25J 15/08; B25J 15/083; B25J 9/1612; B66C 1/28; B21D 43/105; B21D 43/08; B21D 37/16
(Continued)

(56) References Cited

U.S. PATENT DOCUMENTS 4,368,913 A * 1/1983 Brockmann ......... B25J 15/0266
294/203
5,338,150 A * 8/1994 Focke .................... B65G 47/90
294/115
(Continued)

FOREIGN PATENT DOCUMENTS

JP      S62-152688 A    7/1987
JP      H07-156087 A    6/1995
(Continued)

*Primary Examiner* — Paul T Chin
(74) *Attorney, Agent, or Firm* — SOLARIS Intellectual Property Group, PLLC

(57) ABSTRACT

A workpiece transport unit including a pair of arms, an opening/closing mechanism configured to open and close the pair of arms in a horizontal direction, a pair of first placement surfaces provided at the pair of arms and configured for a first workpiece to be placed thereon, and a pair of second placement surfaces provided at the pair of arms and configured for a second workpiece to be placed thereon.

13 Claims, 25 Drawing Sheets

(51) Int. Cl.
*B21D 28/02* (2006.01)
*B21D 37/16* (2006.01)
*B21D 43/02* (2006.01)
*B21D 43/08* (2006.01)
*B21D 43/10* (2006.01)
*B23Q 7/14* (2006.01)
*B25J 15/08* (2006.01)
*B65G 47/90* (2006.01)
*C21D 1/34* (2006.01)

(52) U.S. Cl.
CPC ........... *B21D 37/16* (2013.01); *B21D 43/026* (2013.01); *B21D 43/08* (2013.01); *B23Q 7/1494* (2013.01); *B25J 15/08* (2013.01); *B65G 47/90* (2013.01); *C21D 1/34* (2013.01)

(58) Field of Classification Search
USPC .............................. 294/86.4, 101, 102.1, 198
See application file for complete search history.

(56) References Cited

U.S. PATENT DOCUMENTS

| | | | |
|---|---|---|---|
| 6,592,320 B1 * | 7/2003 | Adams | B66C 1/62 414/620 |
| 6,619,712 B1 * | 9/2003 | McGovern | G21C 19/16 294/86.4 |
| 7,887,108 B1 * | 2/2011 | Cawley | B25J 15/022 294/106 |
| 8,172,292 B1 * | 5/2012 | Andersen | B65B 25/046 294/2 |
| 9,073,217 B2 * | 7/2015 | Xiao | F16H 19/08 |
| 9,956,691 B1 * | 5/2018 | Pentzer | B25J 15/08 |
| 11,452,297 B2 * | 9/2022 | Hare | B65G 47/907 |
| 2018/0245849 A1 | 8/2018 | Ooyama et al. | |
| 2018/0304476 A1 | 10/2018 | Kushida et al. | |
| 2019/0134695 A1 | 5/2019 | Moser et al. | |
| 2019/0201961 A1 | 7/2019 | Nomura et al. | |
| 2022/0032462 A1 * | 2/2022 | Kawakami | B25J 15/0009 |

FOREIGN PATENT DOCUMENTS

| | | |
|---|---|---|
| JP | H10-249771 A | 9/1998 |
| JP | 2003-159686 A | 6/2003 |
| JP | 2004-025326 A | 1/2004 |
| JP | 2004-261958 A | 9/2004 |
| JP | 2012-240770 A | 12/2012 |
| JP | 2017-47490 A | 3/2017 |
| JP | 2017-074643 A | 4/2017 |
| JP | 2017-185592 A | 10/2017 |
| JP | 2018-039023 A | 3/2018 |
| JP | 2019-514692 A | 6/2019 |

* cited by examiner

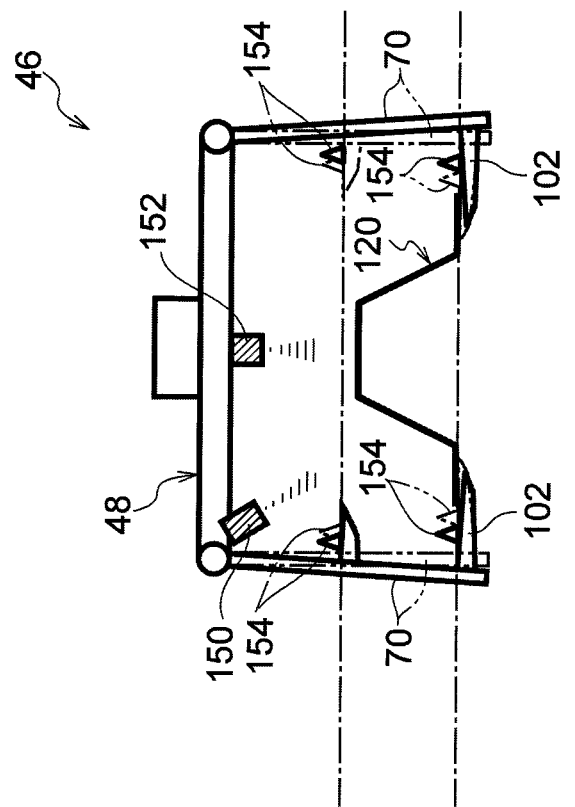
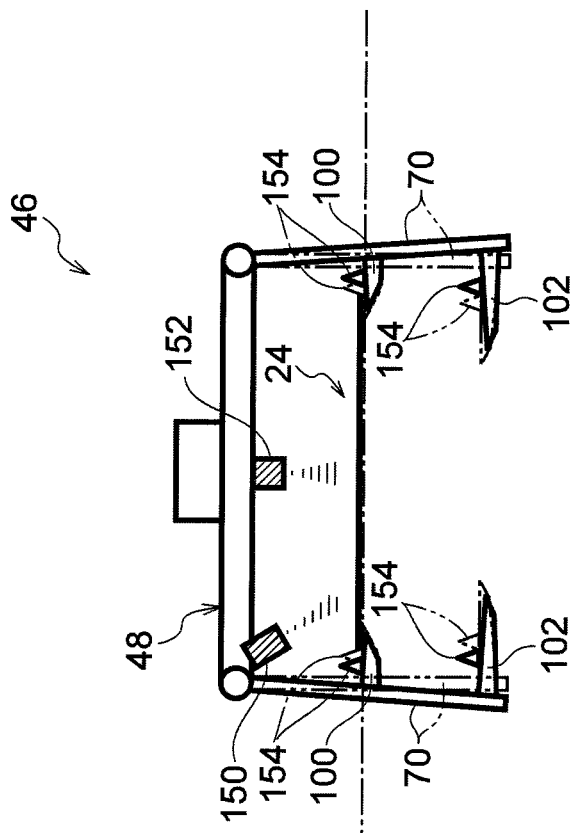
FIG. 15

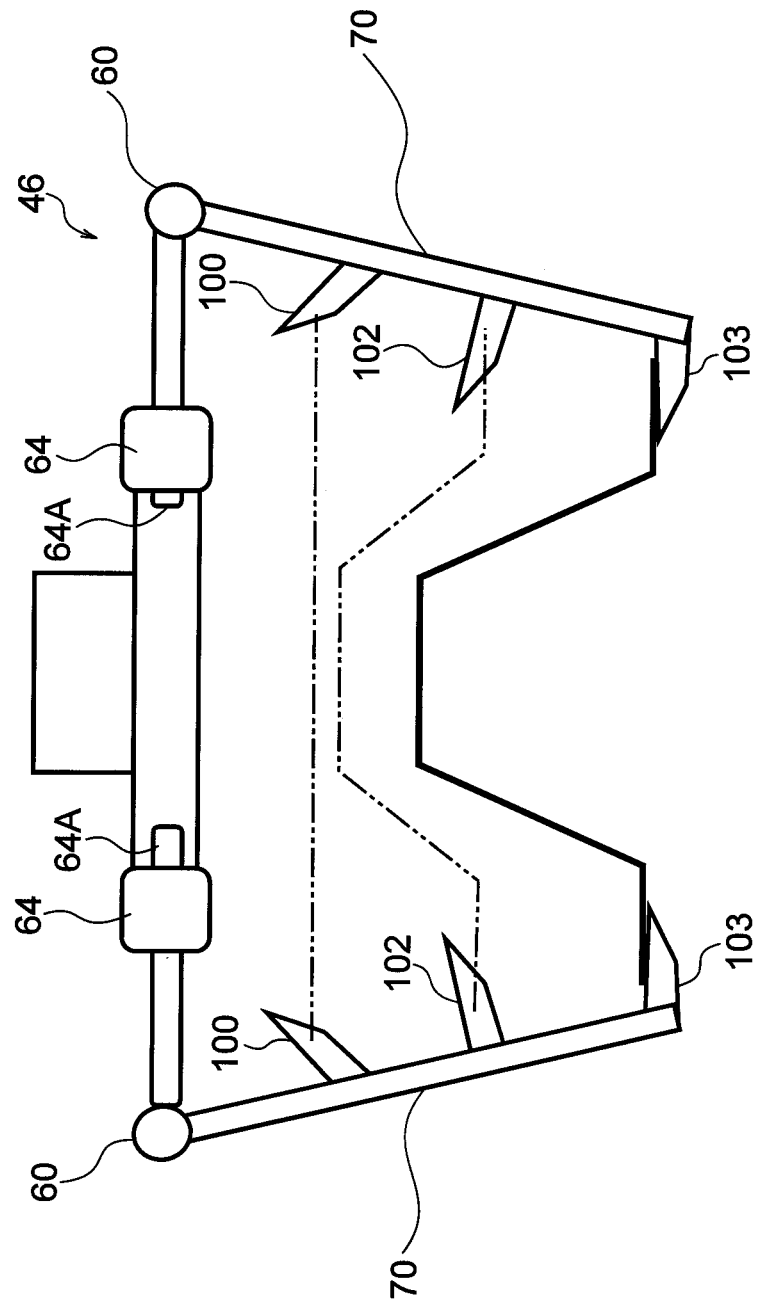

WORKPIECE TRANSPORT UNIT, HOT PRESSING EQUIPMENT, WORKPIECE TRANSPORT METHOD, AND HOT PRESSING METHOD

TECHNICAL FIELD

The present disclosure relates to a workpiece transport unit, a hot pressing equipment, a workpiece transport method, and a hot pressing method.

BACKGROUND ART

Transport devices for lifting and transporting a workpiece using a forked transport unit are known (see, for example, Japanese Patent Application Laid-Open (JP-A) Nos. 2017-47490 and 2017-074643). In such transport devices, due to the structure by which the workpiece is lifted and supported by the transport unit, the workpiece might be moved in a horizontal direction, which makes it difficult to increase the speed of transport.

Transport devices according to first to fifth examples below are examples of transport devices well-suited to increasing the speed of transport. The transport device according to the first example is a transport device that transports a workpiece being gripped using a pair of arms (for example JP-A No. S62-152688). The transport device according to the second example is a transport device that transports a workpiece subject to suction from a suction section (for example JP-A No. H10-249771). The transport device according to the third example is a transport device that transports a workpiece grasped from above and below using plural hooks (for example JP-A No. 2003-159686). The transport device according to the fourth example is a transport device that transports a workpiece placed on a pair of hooks provided at a pair of openable and closeable arms (for example JP-A No. 2017-185592). The transport device according to the fifth example is a transport device that transports a workpiece grasped using plural hooks provided at a pair of openable and closeable arms (for example Japanese National-Phase Publication No. 2019-514692).

SUMMARY OF INVENTION

Technical Problem

However, the transport devices according to the first example to the fifth example described above are limited in terms of the workpiece shapes that can be held.

An object of the present disclosure is to provide a workpiece transport unit, a hot pressing equipment, a workpiece transport method, and a hot pressing method that are capable of holding workpieces of different shapes and of increasing transportation speed.

Solution to Problem

In a first aspect of the present disclosure, a workpiece transport unit is provided including a pair of arms, an opening/closing mechanism configured to open and close the pair of arms in a horizontal direction, a pair of first placement surfaces provided at the pair of arms and configured for a first workpiece to be placed thereon, and a pair of second placement surfaces provided at the pair of arms and configured for a second workpiece to be placed thereon.

The workpiece transport unit may further include a pair of first hooks provided at the pair of arms, and a pair of second hooks provided at the pair of arms, wherein the pair of first hooks include the pair of first placement surfaces, and the pair of second hooks include the pair of second placement surfaces.

Configuration may be such that when the pair of arms are in a closed state, each of the pair of first hooks and each of the pair of second hooks extend toward a side of an opposing arm of the pair of arms that oppose each other in the horizontal direction.

Configuration may be such that the pair of first hooks are respectively provided between leading end portions and base end portions of the pair of arms, and the pair of second hooks are respectively provided at the leading end portions of the pair of arms.

Configuration may be such that respective lengths of the pair of first hooks are different from respective lengths of the pair of second hooks.

Configuration may be such that the opening/closing mechanism includes a rotation shaft that swingably supports the pair of arms.

Configuration may be such that the opening/closing mechanism supports the pair of arms so as to be openable and closeable such that the pair of arms are configured to adopt a closed state in which the pair of arms extend in a vertical direction and oppose each other in the horizontal direction, and an open state in which the pair of arms extend in the horizontal direction.

Configuration may be such that the opening/closing mechanism includes an extension/retraction mechanism that supports the pair of arms so as to be slideable in the horizontal direction.

In a second aspect of the present disclosure, a hot pressing equipment is provided including the workpiece transport unit, a heating furnace, a transport table connected to the heating furnace, a first press configured to perform hot press forming on the first workpiece in order to form the second workpiece, a second press configured to perform hot press forming on the second workpiece, a manipulator configured to move the workpiece transport unit, and a controller configured to control the opening/closing mechanism and the manipulator.

Configuration may be such that the controller is configured to control the manipulator such that a first height of the first workpiece when the first workpiece is being transported from the transport table to the press is the same as a second height of the second workpiece when the second workpiece is being transported from the press to the transport table.

Configuration may be such that the controller is configured to control the manipulator such that a first height of the first workpiece when the first workpiece is being transported from the transport table to the first press is the same as a second height of the second workpiece when the second workpiece is being transported from the first press to the transport table.

Configuration may be such that the controller is configured to control the manipulator such that the workpiece transport unit is moved along a direction in which the pair of arms oppose each other when in the closed state in a case in which the workpiece transport unit moves to transport the first workpiece from the transport table to the first press, in a case in which the workpiece transport unit moves to transport the second workpiece from the first press to the transport table, and in a case in which the workpiece transport unit moves to transport the second workpiece from the transport table to the second press.

Configuration may be such that the first press and the second press each include a lower mold configuring a punch, the lower mold includes a base section and a punch section projecting toward an upper side from an upper face of the base section, and a height direction dimension from the upper face of the base section to an apex face of the punch section is smaller than a dimension between the first placement surface and the second placement surface.

Configuration may be such that the transport table includes a plurality of transport rolls, and a width of each of the arms is narrower than an interval between the transport rolls.

Configuration may be such that the transport table includes a top face and a groove formed in the top face, and a width of each of the arms is narrower than a width of the groove.

In a third aspect of the present disclosure, a workpiece transport method that employs the workpiece transport unit is provided at perform a first transport process of closing the pair of arms to achieve a state in which the first workpiece is placed on the pair of first placement surfaces and moving the workpiece transport unit so as to transport the first workpiece, and a second transport process of closing the pair of arms to achieve a state in which the second workpiece is placed on the pair of second placement surfaces and moving the workpiece transport unit so as to transport the second workpiece.

In a fourth aspect of the present disclosure, a hot pressing method employing the hot pressing equipment is provided at perform processing including a pre-heating transport process of closing the pair of arms to achieve a state in which a blank configuring the first workpiece is placed on the pair of first placement surfaces, moving the workpiece transport unit to above the transport table, and opening the pair of arms to place the blank on the transport table, a first heating process of moving the blank that has been placed on the transport table into the heating furnace and then moving the blank from inside the heating furnace onto the transport table after heating the blank inside the heating furnace, a post-first heating transport process of closing the pair of arms to achieve a state in which the blank is placed on the pair of first placement surfaces, moving the workpiece transport unit to above a lower mold of the first press, and opening the pair of arms so as to set the blank on the lower mold of the first press, a first pressing process of hot press forming the blank between the lower mold and an upper mold of the first press to form the blank into a first-stage molded article configuring the second workpiece, a post-first pressing transport process of closing the pair of arms to achieve a state in which the first-stage molded article is placed on the pair of second placement surfaces, moving the workpiece transport unit to above the transport table, and opening the pair of arms to place the first-stage molded article on the transport table, a second heating process of moving the first-stage molded article that has been placed on the transport table into the heating furnace and then moving the first-stage molded article from inside the heating furnace onto the transport table after heating the first-stage molded article inside the heating furnace, a post-second heating transport process of closing the pair of arms to achieve a state in which the first-stage molded article is placed on the pair of second placement surfaces, moving the workpiece transport unit to above a lower mold of the second press, and opening the pair of arms so as to set the first-stage molded article on the lower mold of the second press, and a second pressing process of hot press forming the first-stage molded article between the lower mold and an upper mold of the second press to form the first-stage molded article into a second-stage molded article configuring the second workpiece.

Advantageous Effects of Invention

The present disclosure enables the workpiece transport unit, the hot pressing equipment, the workpiece transport method, and the hot pressing method that are capable of holding workpieces of different shapes and of increasing transportation speed to be provided.

BRIEF DESCRIPTION OF DRAWINGS

FIG. 15 is a diagram comparing a first height when transporting a blank and a second height when transporting a first-stage molded article using a workpiece transport unit according to the third exemplary embodiment in front view.

FIG. 25 is a flowchart illustrating a third modified example of operation of a workpiece transport unit according to the fifth modified example.

DESCRIPTION OF EMBODIMENTS

Molded components formed by hot press forming may be employed in components, including for example automotive components. Enhanced toughness and strength are demanded of molded components formed by hot press forming. Plural rounds of heat treatment may be implemented in order to satisfy such demands. Each heat treatment requires a heated workpiece to be transported to a press within a short space of time.

However, in workpiece transport units employed in conventional hot pressing equipment, the need to rotate the workpiece or perform a handover operation gives rise to difficulties in shortening the transportation time. Moreover, in a case in which the workpiece is lifted and supported by a forked workpiece transport unit, heat of the workpiece is liable to escape into the workpiece transport unit, or temperature unevenness is liable to occur in lines across the workpiece, such that locations that cannot be molded with the intended thermal history might be created in the workpiece.

Moreover, in a case in which the workpiece is subjected to heat treatment, there is a difference between a pre-heating temperature and a post-heating temperature of the workpiece. Moreover, in a case in which the workpiece is subjected to hot press forming, the shape of the workpiece prior to forming (the blank) differs from that of the workpiece after forming (the molded article). There is therefore a need to prepare workpiece transport units suited to the temperature and shape of the workpiece. There is moreover a need to modify the transportation method according to the shape of the workpiece and so on, which may pose an obstacle to high speed operation.

The creators of the present disclosure have proposed the following exemplary embodiments in response to the issues described above.

First Exemplary Embodiment

Explanation follows regarding a first exemplary embodiment, with reference to the drawings.

Hot Pressing Equipment

Figure 1:
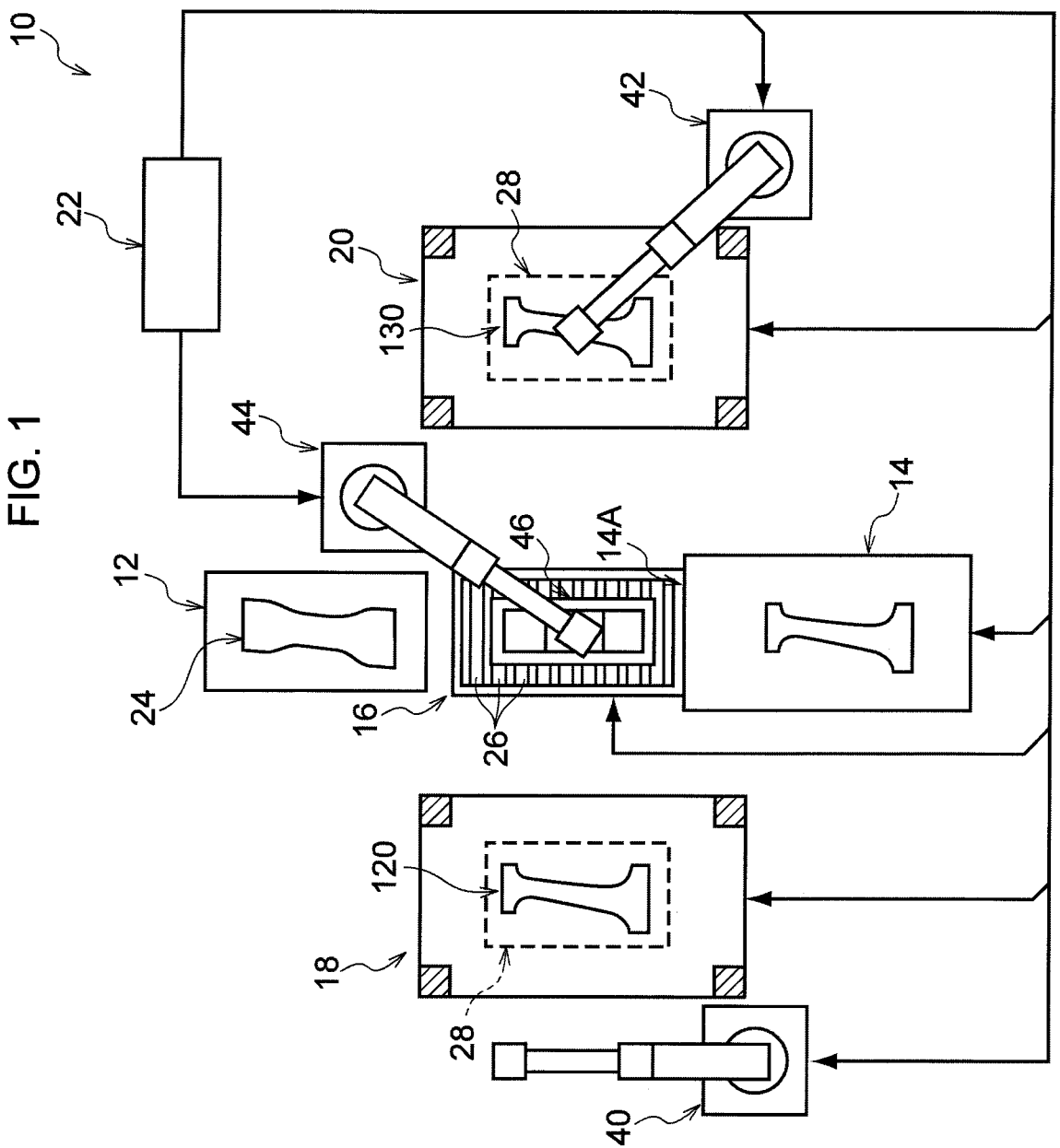
FIG. 1 is a plan view schematically illustrating a hot pressing equipment according to a first exemplary embodiment.

First, explanation follows regarding configuration of a hot pressing equipment 10 according to the first exemplary embodiment. As illustrated in FIG. 1, the hot pressing equipment 10 includes a table 12, a heating furnace 14, a transport table 16, a first press 18, a second press 20, and a controller 22.

The first press 18 and the second press 20 are disposed discretely to each other in a horizontal direction, and the transport table 16 is disposed between the first press 18 and the second press 20. A first end portion of the transport table 16 is connected to an entrance/exit 14A of the heating furnace 14, and the table 12 is disposed beside a second end portion of the transport table 16. A blank 24 that has not yet been pressed is placed on the table 12.

As will be described in detail later, the hot pressing equipment 10 is used to carry out a first heating process, a first pressing process, a second heating process, and a second pressing process.

In the first heating process, the blank 24 is heated in the heating furnace 14 after being transported from the table 12 into the heating furnace 14. In the first pressing process, the blank 24 is hot pressed using the first press 18 after being transported from the heating furnace 14 to the first press 18, thereby forming a first-stage molded article 120. In the second heating process, the first-stage molded article 120 is heated by the heating furnace 14 after being transported from the first press 18 to the heating furnace 14. In the second pressing process, the first-stage molded article 120 is hot pressed using the second press 20 after being transported from the heating furnace 14 to the second press 20, thereby forming a second-stage molded article 130.

As an example, the blank 24 is a flat plate shaped steel sheet that has been cut into a predetermined shape. As an example, the first-stage molded article 120 and the second-stage molded article 130 each have a three-dimensional shape with a hat-shaped cross-section profile. In the following explanation, the blank 24, the first-stage molded article 120, and the second-stage molded article 130 may all be referred to as the workpiece. The blank 24 is an example of a "first workpiece" of the present disclosure, and the first-stage molded article and the second-stage molded article 130 are examples of a "second workpiece" of the present disclosure.

Heating Furnace

The heating furnace 14 is a device used to heat the workpiece. The heating furnace 14 may, for example, be configured by a high frequency induction furnace, a resistance furnace, a gas furnace, or an infrared furnace. Plural rollers that are rotationally driven by a non-illustrated drive mechanism are provided inside the heating furnace 14. The workpiece is moved in and out of the heating furnace 14 by rotation of the plural rollers.

Transport Table

The transport table 16 includes plural rollers 26 that are rotationally driven by a non-illustrated drive mechanism. The workpiece is transported between the transport table 16 and the inside of the heating furnace 14 by rotating the plural rollers 26 in synchronization with the plural rollers inside the heating furnace 14.

Figure 2:
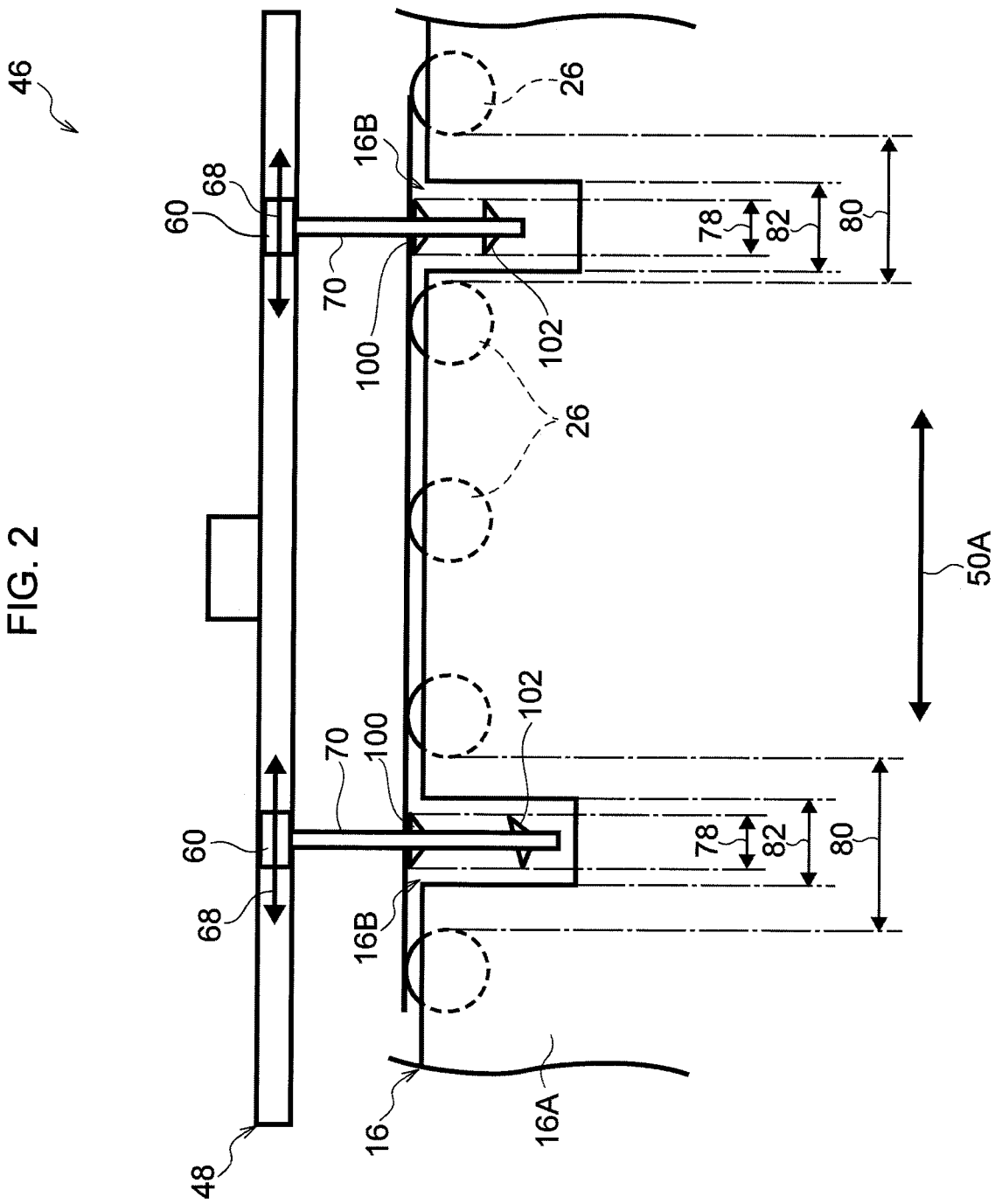
FIG. 2 is a side view illustrating relevant portions of a workpiece transport unit and a transport table according to the first exemplary embodiment.
Figure 3:
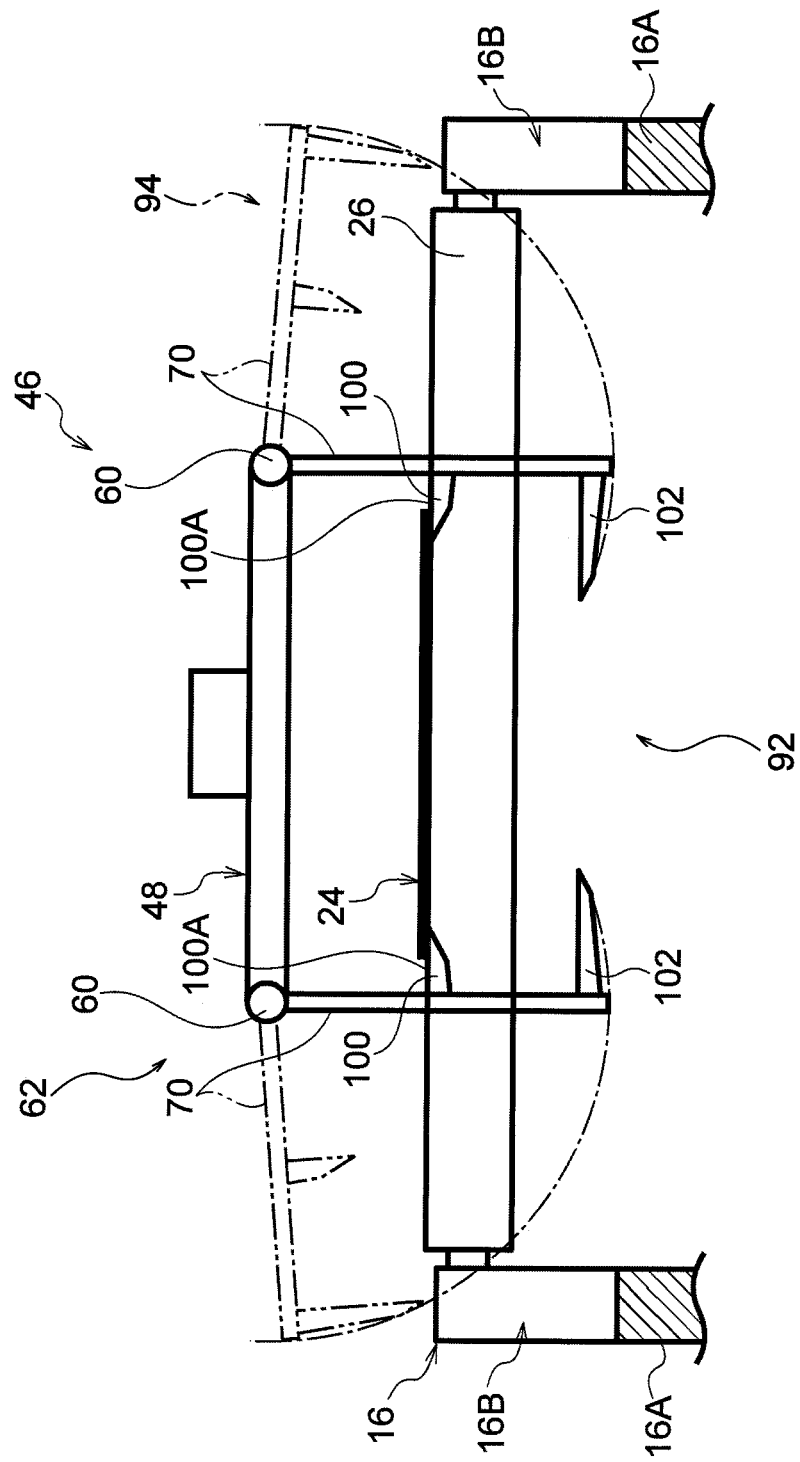
FIG. 3 is a front view cross-section illustrating relevant portions of a workpiece transport unit and a transport table according to the first exemplary embodiment.

As illustrated in FIG. 2, the plural rollers 26 are disposed at intervals in a horizontal direction. As illustrated in FIG. 3, plural grooves 16B are formed in side walls 16A on both sides of the transport table 16 at positions avoiding the rollers 26 (see also FIG. 2). The plural grooves 16B are formed at intervals in the direction in which the plural rollers 26 are arranged.

First Press

As illustrated in FIG. 1, the first press 18 includes a lower mold 28 and a non-illustrated upper mold. The first press 18 is employed in first-stage molding in which the workpiece is subjected to shallow drawing as an example of hot press forming. As an example, the lower mold 28 configures a punch, while the upper mold configures a die. Coolant flow channels are provided in both the lower mold 28 and the upper mold of the first press 18. In the first press 18, heat taken from the workpiece during pressing is dissipated through coolant. The first press 18 is an example of a "press" of the present disclosure.

Second Press

Figure 4:
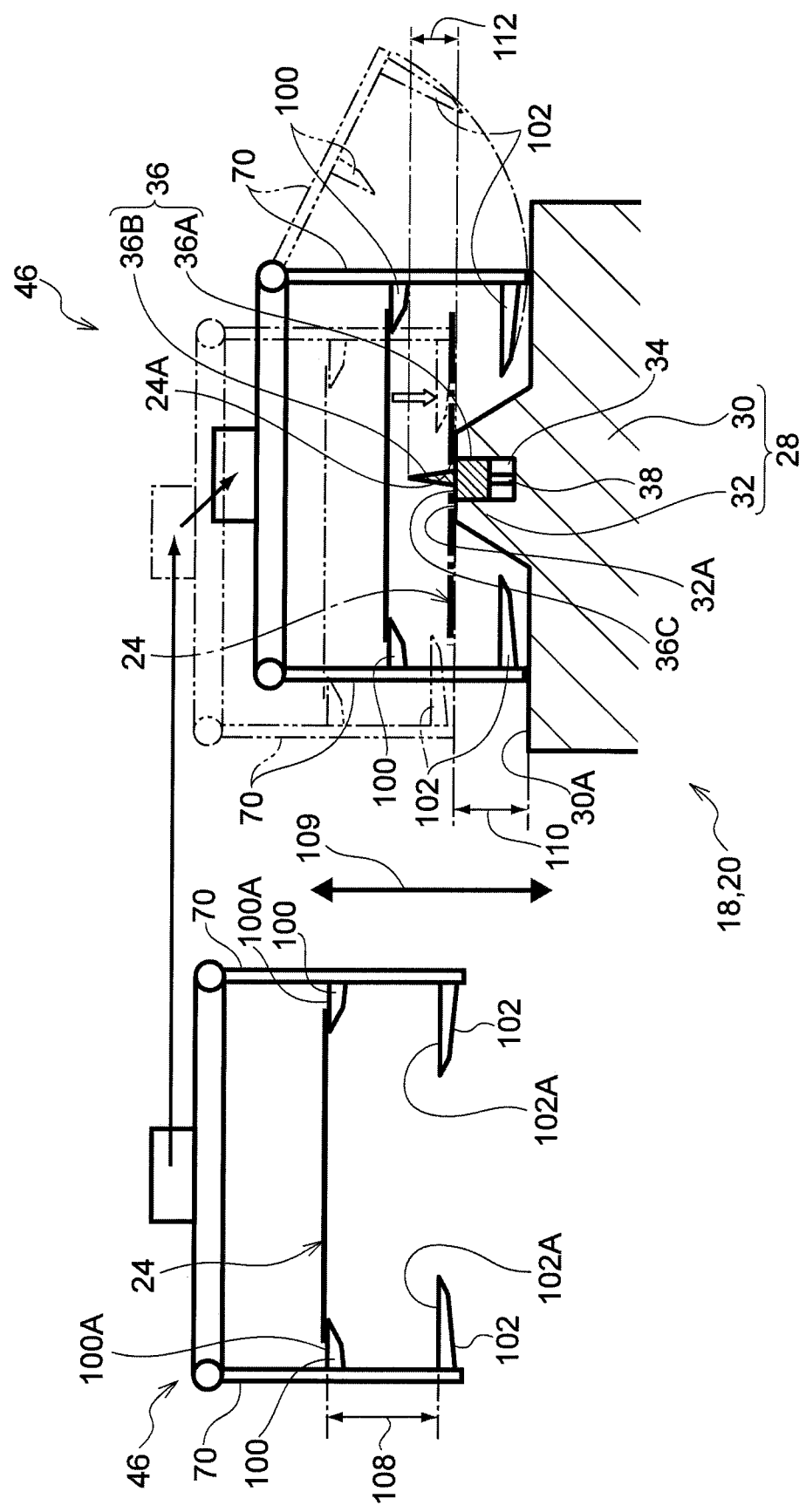
FIG. 4 is an explanatory diagram to explain transportation of a blank to a first press using a workpiece transport unit according to the first exemplary embodiment in front view.
Figure 5:
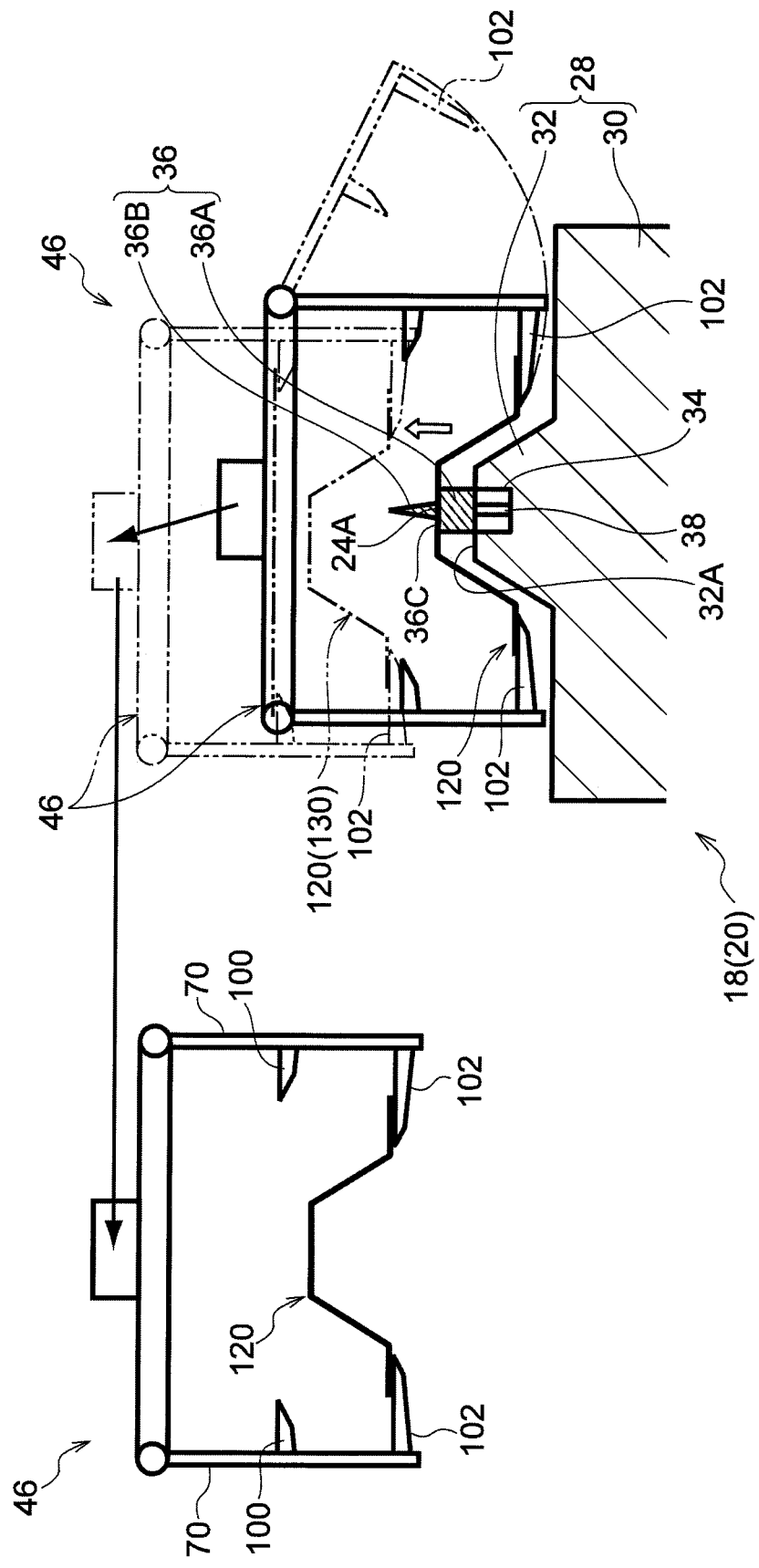
FIG. 5 is an explanatory diagram to explain transportation of a first-stage molded article from a first press using a workpiece transport unit according to the first exemplary embodiment in front view.

The second press 20 includes a lower mold 28 and a non-illustrated upper mold. In the interests of simplicity, the lower mold 28 of the second press 20 is appended with the same reference numeral as the lower mold of the first press 18. In FIG. 4 and FIG. 5, in the interests of simplicity, the lower mold 28 of the first press 18 and the lower mold 28 of the second press 20 are illustrated as having the same shape as each other. However, the lower mold 28 of the first press 18 and the lower mold 28 of the second press 20 are shaped differently from each other.

The second press 20 is employed in second-stage molding in which the workpiece is subjected to deep drawing as an example of hot press forming. As an example, the lower mold 28 configures a punch, while the upper mold configures a die. Coolant flow channels are provided in both the lower mold 28 and the upper mold of the second press 20. In the second press 20, heat taken from the workpiece during pressing is dissipated through coolant.

As illustrated in FIG. 4 and FIG. 5, the lower molds 28 of the first press 18 and the second press 20 each include a base section 30, and a punch section 32 projecting from an upper face 30A of the base section 30.

Each of the punch sections 32 is formed with a housing portion 34 opening onto an apex face 32A of the punch section 32. A lifter 36 that is capable of being raised and lowered is housed in the housing portion 34. The lifter 36 includes a body 36A that is raised and lowered by a shaft 38, and a locating pin 36B that projects further toward the upper side than the body 36A.

As illustrated in FIG. 4, in a lowered state of the body 36A of the lifter 36, an upper face 36C of the body 36A and the apex face 32A of the punch section 32 are at the same height as each other. In this state, the locating pin 36B projects further toward the upper side than the apex face 32A. As illustrated in FIG. 5, in a state in which the body 36A of the lifter 36 has been raised, the height of the upper face 36C of the body 36A is higher than that of the apex face 32A of the punch section 32.

Manipulators

As illustrated in FIG. 1, a first manipulator 40 is provided in the vicinity of a corner of the first press 18. The first manipulator 40 is capable of removing the first-stage molded article 120 after being hot pressed in the first press 18. A second manipulator 42 is provided in the vicinity of a corner of the second press 20. The second manipulator 42 is capable of removing the second-stage molded article 130 after being hot pressed in the second press 20.

A third manipulator 44 is provided in the vicinity of a corner of the second press 20, between the first press 18 and the second press 20. The third manipulator 44 is connected to a workpiece transport unit 46. The third manipulator 44 uses the workpiece transport unit 46 to transport the workpiece between the table 12, the transport table 16, the first press 18, and the second press 20. The third manipulator 44 is an example of a "manipulator configured to move the workpiece transport unit" of the present disclosure.

Controller

The controller 22 operates the hot pressing equipment 10 using control signals output to the heating furnace 14, the transport table 16, the first press 18, the second press 20, the first manipulator 40, the second manipulator 42, and the third manipulator 44. The controller 22 is, for example, configured by a computer including a CPU, ROM, RAM, and the like.

Workpiece Transport Unit

Figure 6:
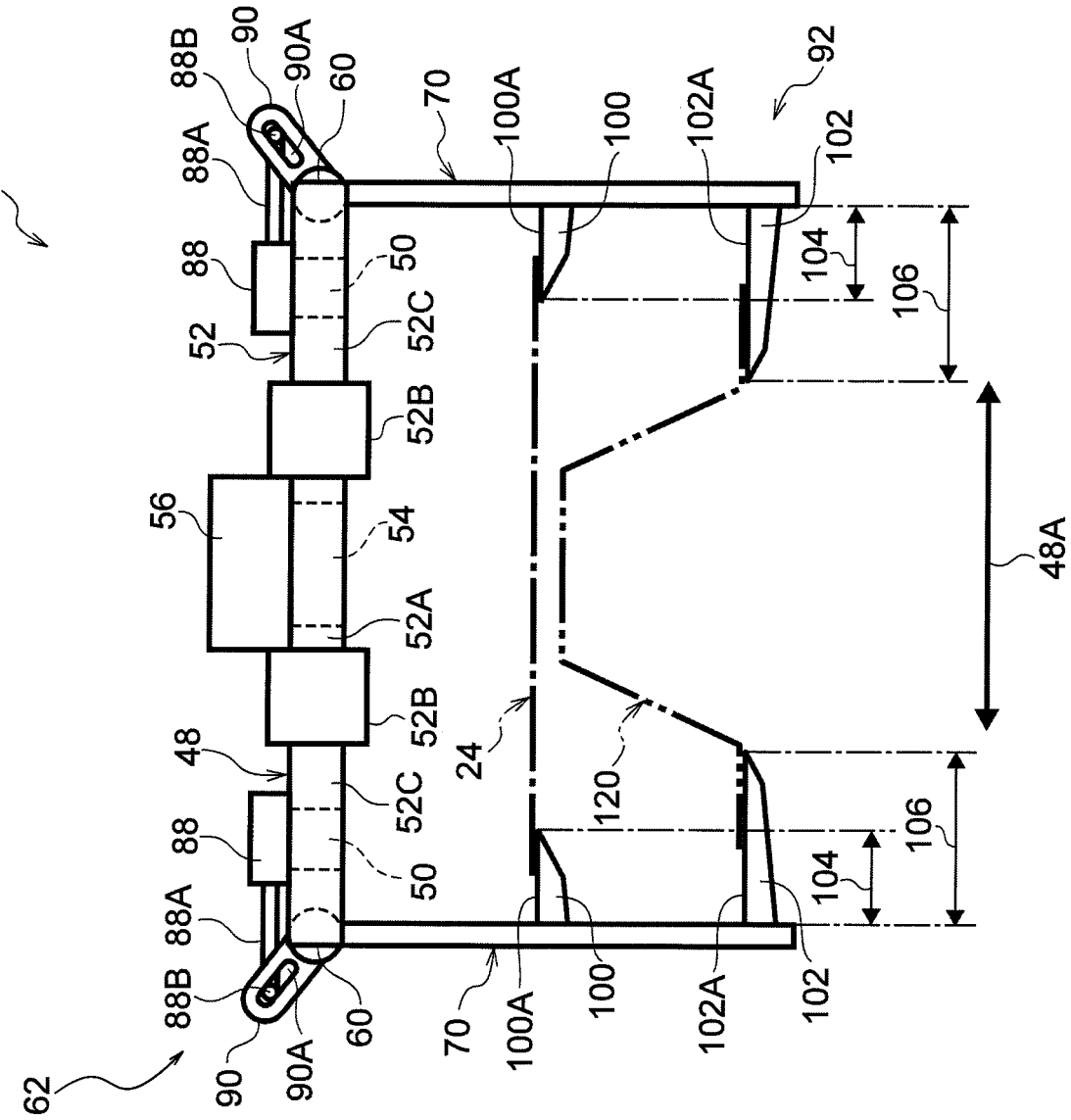
FIG. 6 is a front view illustrating a closed state of a workpiece transport unit according to the first exemplary embodiment.
Figure 7:
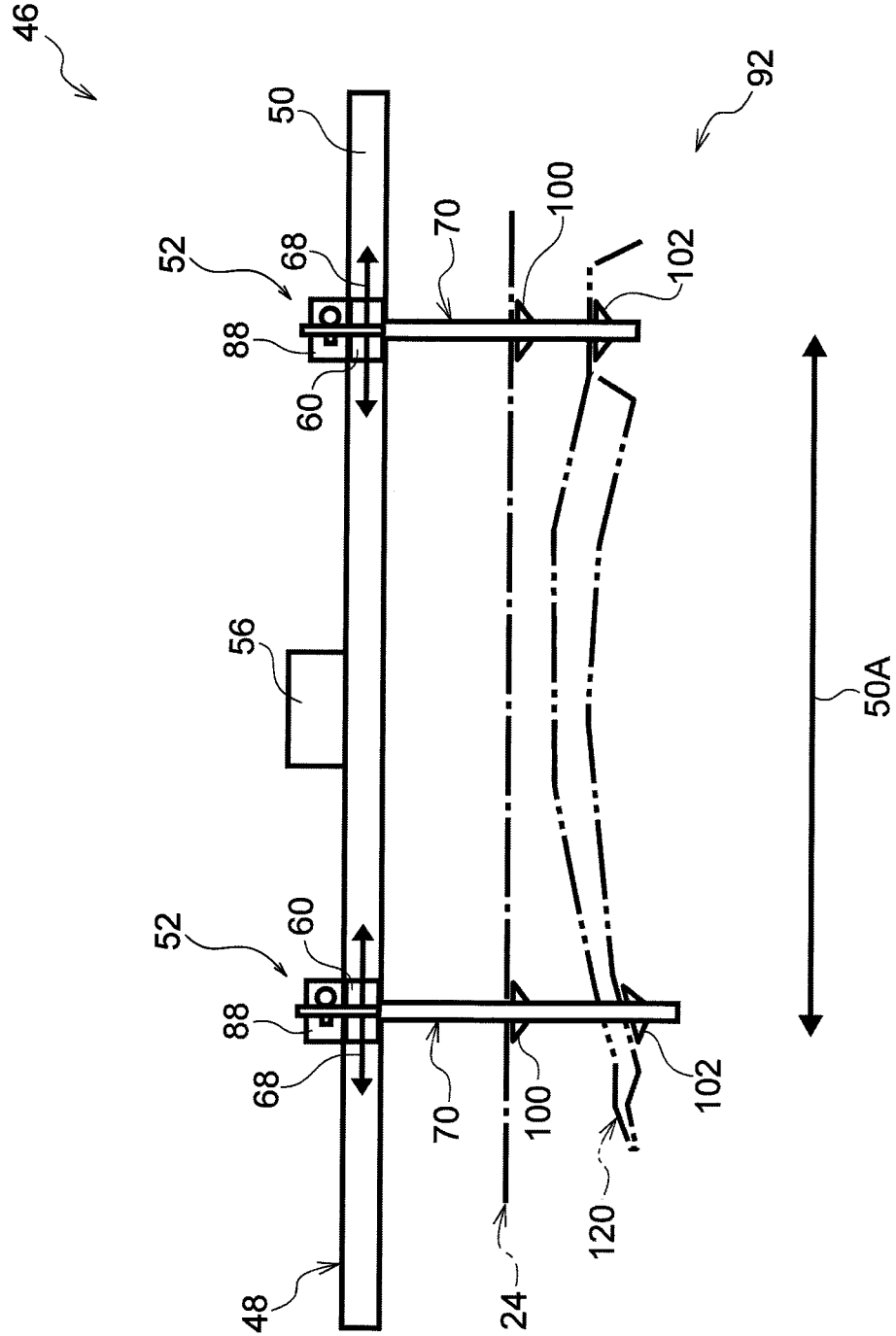
FIG. 7 is a side view illustrating a closed state of a workpiece transport unit according to the first exemplary embodiment.

As illustrated in FIG. 6 and FIG. 7, the workpiece transport unit 46 includes a base frame 48 formed in a quadrilateral frame shape in plan view. The base frame 48 includes a pair of lengthwise members 50 disposed discretely to one another, and a pair of widthwise members 52 respectively coupling together first end portions and second end portions of the pair of lengthwise members 50. Each of the pair of lengthwise members 50 and the pair of widthwise members 52 is configured with a rectangular tube shaped cross-section profile. The length of the lengthwise members 50 is longer than that of the widthwise members 52, such that the base frame 48 is formed in a rectangular frame shape in plan view.

As illustrated in FIG. 6, a coupling member 54 spans between central portions of the pair of widthwise members 52. A joint 56 that is connected to the third manipulator 44 (see FIG. 1) is provided at a central portion of the coupling member 54.

Each of the widthwise members 52 includes a central portion 52A fixed to an end portion of the coupling member 54, a pair of extension/retraction mechanisms 52B provided at both end portions of the central portion 52A, and a pair of extension portions 52C extending from the pair of extension/retraction mechanisms 52B toward the respective lengthwise members 50. Leading ends of the extension portions 52C are connected to the lengthwise members 50.

The extension/retraction mechanisms 52B adjust horizontal direction slide amounts of the extension portions 52C. The extension/retraction mechanisms 52B may have a structure in which the slide amounts of the extension portions 52C are adjusted manually, or may have a structure provided with an actuator or the like to adjust the slide amounts of the extension portions 52C automatically. This enables the length of the widthwise members 52, namely the distance between the pair of lengthwise members 50, to be adjusted. The pair of extension/retraction mechanisms 52B include functionality to slidably support a pair of arms 70, described later, in the horizontal direction.

As illustrated in FIG. 6 and FIG. 7, the base frame 48 is provided with four rotation shafts 60. The four rotation shafts 60 are disposed discretely to each other in a length direction 48A of the widthwise members 52 and a length direction 50A of the lengthwise members 50. The length direction 48A of the widthwise members 52 and the length direction 50A of the lengthwise members 50 are each parallel to a horizontal direction.

The four rotation shafts 60 are disposed in the vicinity of the four corners of the base frame 48 that is formed in a quadrilateral frame shape in plan view. Of the four rotation shafts 60, the two rotation shafts 60 positioned on a first side in the length direction 48A, namely the two rotation shafts 60 positioned on both end sides of a first of the lengthwise members 50, are fixed to this first lengthwise member 50. Similarly, of the four rotation shafts 60, the two rotation shafts 60 positioned on a second side in the length direction 48A, namely the two rotation shafts 60 positioned on both end sides of a second of the lengthwise members 50, are fixed to this second lengthwise member 50.

Arms

As illustrated in FIG. 6 and FIG. 7, the workpiece transport unit 46 includes two sets, each set configured by one pair of the arms 70. Each of the sets configured by one pair of arms 70 is arranged in the length direction 48A of the widthwise members 52. A first pair of arms 70 and a second pair of arms 70 are disposed discretely to each other in the length direction 50A of the lengthwise members 50. The first pair of arms 70 is an example of a "pair of arms" of the present disclosure. Similarly, the second pair of arms 70 is an example of a "pair of arms" of the present disclosure.

Base end portions (upper end portions) of the respective arms 70 are supported by the respective rotation shafts 60 so as to be capable of swinging. An axial direction 68 of the rotation shafts 60 that support the base end portions of the arms 70 so as to be capable of swinging is parallel to the length direction 50A of the lengthwise members 50.

As illustrated in FIG. 2, each of the arms 70 has a width 78 along the axial direction 68 of the rotation shafts 60. The width 78 of the arms 70 is narrower than a separation 80 between a first roller 26 and a second roller 26 out of neighboring rollers 26 on the transport table 16. Moreover, the width 78 of the arms 70 is narrower than a width 82 of the grooves 16B formed in the side walls 16A (see FIG. 3) of the transport table 16 described previously.

Note that the width 78 of the arms 70 is a maximum width dimension in the axial direction 68 including a pair of first hooks 100 and a pair of second hooks 102, described later. The separation between the first pair of arms 70 and the second pair of arms 70 is substantially the same as the separation between two of the grooves 16B. This enables the respective arms 70 to pass through the grooves 16B corresponding to the respective arms 70 and thus move toward the inner side of the pair of side walls 16A (see also FIG. 3).

Arm Drivers

As illustrated in FIG. 6, arm drivers 88 are provided at locations of the lengthwise members 50 corresponding to the rotation shafts 60. The arm drivers 88 are, for example, configured by air cylinders. Each of the arm drivers 88 includes an actuation shaft 88A. The arm drivers 88 are actuated in order to adjust slide amounts of the actuation shafts 88A. A pin 88B is provided at a leading end of each of the actuation shafts 88A. The pin 88B is inserted into an elongated hole 90A of a link member 90 extending obliquely toward the upper side from the base end portion of the corresponding arm 70 so as to be capable of moving and rotating in the elongated hole 90A.

As illustrated in FIG. 6, when the actuation shafts 88A have slid toward the outer sides of bodies of the corresponding arm drivers 88, the corresponding pair of arms 70 hangs down so as to place the pair of arms 70 in a closed state 92. When the pair of arms 70 are in the closed state 92, the pair of arms 70 extend in a vertical direction and oppose each other in the horizontal direction.

Figure 8:
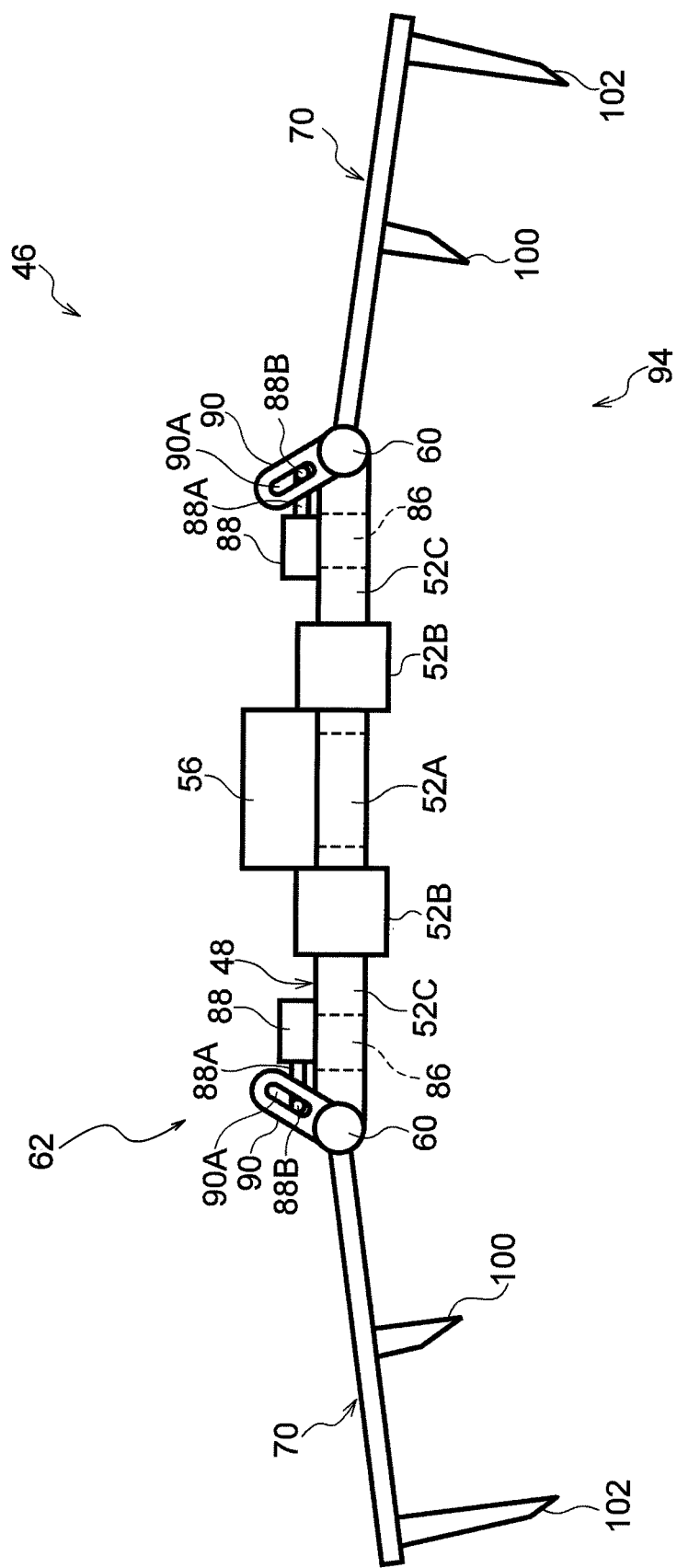
FIG. 8 is a front view illustrating an open state of a workpiece transport unit according to the first exemplary embodiment.

As illustrated in FIG. 8, when the actuation shafts 88A slide toward the inside of the bodies of the corresponding arm drivers 88, the corresponding pair of arms 70 spread out in the horizontal direction so as to place the pair of arms 70 in an open state 94. When the pair of arms 70 are in the open state 94, the pair of arms 70 extend in the horizontal direction.

In the following explanation, the closed state 92 of the pairs of arms 70 is also referred to as a closed state of the workpiece transport unit 46. Similarly, the open state 94 of the pairs of arms 70 is also referred to as an open state of the workpiece transport unit 46.

The extension/retraction mechanisms 52B, the rotation shafts 60, the arm drivers 88, the pins 88B, and the link members 90 corresponding to one pair of arms 70 configure an opening/closing mechanism 62 that opens and closes this pair of arms 70 in the horizontal direction. In this manner, the pair of arms 70 are supported by the opening/closing mechanism 62 so as to be openable and closeable in the horizontal direction so as to adopt the closed state 92 and the open state 94. The opening/closing mechanism 62 supports the pair of arms 70 so as to be capable of swinging about the rotation shafts 60.

Hooks

As illustrated in FIG. 6, each pair of arms 70 is provided with a pair of the first hooks 100. Each pair of arms 70 is also provided with a pair of the second hooks 102. The pair of first hooks 100 are provided between leading end portions and the base end portions of the pair of arms 70. As an example, the pair of first hooks 100 are provided at central portions between the leading end portions and the base end portions of the pair of arms 70. The pair of second hooks 102 are provided at the leading end portions of the pair of arms 70.

In the first exemplary embodiment, as an example, explanation is given regarding a case in which each pair of arms 70 is provided with a pair of first hooks 100 and a pair of second hooks 102. However, the present disclosure is not limited thereto. For example, a pair of third hooks may be additionally provided at each pair of arms 70. Any number of hook pairs may be provided at the pairs of arms 70.

The pair of first hooks 100 extend toward the inner side of the pair of arms 70 that oppose each other in the horizontal direction when in the closed state 92, namely toward the side of an opposing arm 70 of the pair of arms 70. Similarly the pair of second hooks 102 extend toward the mutually opposing arm 70 of the pair of arms 70 that oppose each other in the horizontal direction when in the closed state 92.

Each of the pair of first hooks 100 includes a first placement surface 100A. Namely, upper surfaces of the pair of first hooks 100 form the respective first placement surfaces 100A. Similarly, each of the pair of second hooks 102 includes a second placement surface 102A. Namely, upper surfaces of the pair of second hooks 102 form the respective second placement surfaces 102A.

The first placement surfaces 100A formed to the pair of first hooks 100 are positioned at the same height as each other when the pair of arms 70 are in the closed state. Similarly, the second placement surfaces 102A formed to the pair of second hooks 102 are positioned at the same height as each other when the pair of arms 70 are in the closed state. The first placement surfaces 100A are positioned at higher positions than the second placement surfaces 102A when the pair of arms 70 are in the closed state.

As an example, the pair of first hooks 100 have the same length as each other, and the pair of second hooks 102 also have the same length as each other. The lengths of the pair of first hooks 100 are different from the lengths of the pair of second hooks 102.

As an example, a first length dimension 104 from a base end to a leading end of each of the first hooks 100 is shorter than a second length dimension 106 from a base end to a leading end of each of the second hooks 102. Accordingly, a separation between the leading ends of the pair of first hooks 100 is wider than a separation between the leading ends of the pair of second hooks 102 when in the closed state 92.

As a specific example, the first length dimension 104 of the first hooks 100 is set to a length that enables edges of the blank 24 to be placed on the first placement surfaces 100A of the pair of first hooks 100 when in the closed state 92. The first-stage molded article 120 has a narrower width dimension and a higher height dimension than the blank 24 consistent with being formed into a three-dimensional shape. The second length dimension 106 of the second hooks 102 is set to a length that enables edges of the first-stage molded article 120 to be placed on the second placement surfaces 102A of the pair of second hooks 102 when in the closed state 92.

As illustrated in FIG. 4, a dimension 108 from the second placement surfaces 102A of the second hooks 102 to the first placement surfaces 100A of the first hooks 100 is greater than a dimension 110 in a height direction 109 from the upper face 30A of the base section 30 of the lower mold 28 to the apex face 32A of the punch section 32. In other words, the dimension 110 of the lower mold 28 is smaller than the dimension 108 from the second placement surfaces 102A of the second hooks 102 to the first placement surfaces 100A of the first hooks 100. The dimension 108 is larger than a dimension obtained by adding together the dimension 110, a height direction dimension 112 of the locating pin 36B, and a tolerance margin.

Namely, as described later, even were a second height 124 of the first-stage molded article 120 (see FIG. 9) when the first-stage molded article 120 is transported from the first press 18 to the transport table 16 to be the same as a first height 122 of the blank 24 (see FIG. 9) when the blank 24 is transported from the transport table 16 to the first press 18, the dimension 108 is sufficient to suppress interference between the blank 24 and the locating pin 36B when the blank 24 is set in the lower mold 28.

As illustrated in FIG. 3, the depth of the grooves 16B formed in the side walls 16A on both sides of the transport table 16 is set to a depth such that the arms 70, the first hooks 100, and the second hooks 102 do not interfere with bottom faces of the grooves 16B when openable and closeable the pair of arms 70.

Hot Pressing Method

Next, explanation follows regarding a hot pressing method according to the first exemplary embodiment. The hot pressing method according to the first exemplary embodiment is executed using the hot pressing equipment 10 described above. The hot pressing method is a method for forming a double-quenched molded article, and includes a pre-heating transport process, a first heating process, a post-first heating transport process, a first pressing process, a post-first pressing transport process, a second heating process, a post-second heating transport process, a second pressing process, and a post-second pressing transport process.

The hot pressing method described below is implemented by the controller 22 controlling the heating furnace 14, the transport table 16, the first press 18, the second press 20, the second manipulator 42, and the third manipulator 44.

Pre-Heating Transport Process

In the pre-heating transport process, the workpiece transport unit 46 is moved above the table 12 using the third manipulator 44 illustrated in FIG. 1. When this is performed, the workpiece transport unit 46 is in the open state. After adjusting the height of the workpiece transport unit 46, the workpiece transport unit 46 is then placed in the closed state such that the blank 24 on the table 12 is placed on the first placement surfaces 100A formed to the pairs of first hooks 100 (see FIG. 6).

Next, the workpiece transport unit 46 is moved to above the transport table 16 using the third manipulator 44 illustrated in FIG. 1. The workpiece transport unit 46 is then placed in the open state so as to place the blank 24 on the transport table 16 as illustrated in FIG. 2.

Note that the width 78 of the arms 70 is narrower than the separation 80 between the neighboring rollers 26. Moreover, the width 78 of the arms 70 is also narrower than the width 82 of the grooves 16B formed in the side walls 16A of the transport table 16. This enables the workpiece transport unit 46 to be placed in the open state without the arms 70 interfering with the side walls 16A (see FIG. 3). The workpiece transport unit 46 then stands by in the open state at the position where it was placed in the open state.

The pre-heating transport process is an example of a "a first transport process of closing the pair of arms to achieve a state in which the first workpiece is placed on the first placement surfaces and moving the workpiece transport unit so as to transport the first workpiece" of the present disclosure.

First Heating Process

In the first heating process, the plural rollers 26 provided at the transport table 16 illustrated in FIG. 1 and the plural rollers provided in the heating furnace 14 are rotated in order to move the blank 24 into the heating furnace 14. The blank 24 is then heated in the heating furnace 14.

After the blank 24 has been heated, the plural rollers 26 provided at the transport table 16 and the plural rollers provided at the heating furnace 14 are rotated. The blank 24 is thereby moved onto the transport table 16, such that the blank 24 is disposed under the workpiece transport unit 46 that is standing by above the transport table 16.

Post-First Heating Transport Process

In the post-first heating transport process, the workpiece transport unit 46 that was standing by above the transport table 16 in the open state is placed in the closed state while maintaining the same height. Note that as described above, the workpiece transport unit 46 has been standing by in the open state at the position where it was placed in the open state when the blank 24 is passed to the transport table 16 during the pre-heating transport process.

Accordingly, in the post-first heating transport process, the workpiece transport unit 46 is placed in the closed state while maintaining the same height, and no lowering operation or the like of the workpiece transport unit 46 is performed. This enables the blank 24 on the transport table 16 to be placed on the first placement surfaces 100A formed to the pairs of first hooks 100. This enables the amount of time taken to transport the blank 24 from the heating furnace 14 to the first press 18 to be shortened.

As described above, the width 78 of the respective arms 70 is narrower than the separation 80 between the neighboring rollers 26. The width 78 of the respective arms 70 is also narrower than the width 82 of the respective grooves 16B formed in the side walls 16A of the transport table 16. This enables the arms 70 to pass through the corresponding grooves 16B and move to the inner side of the pair of side walls 16A while maintaining the height of the workpiece transport unit 46, and thus enables the pairs of first hooks 100 to be disposed at a lower side of the blank 24 (see FIG. 3).

Moreover, the blank 24 has a wider lateral width than the first-stage molded article 120 (see FIG. 5) that will be formed by the first press 18, described later. Accordingly, the blank 24 can be placed on the first placement surfaces 100A of the pairs of first hooks 100 that are shorter in length than the pairs of second hooks 102. Moreover, the contact surface area between the blank 24 and the pairs of first hooks 100 can be reduced in comparison to cases in which the blank 24 is placed on the second placement surfaces 102A of the pairs of second hooks 102 that are longer in length than the pairs of first hooks 100. This thereby enables heat of the blank 24 to be suppressed from escaping through the pairs of first hooks 100.

Next, in the post-first heating transport process, the workpiece transport unit 46 is moved to the first press 18 using the third manipulator 44 illustrated in FIG. 1. When this is performed, the third manipulator 44 is actuated so as to move the workpiece transport unit 46 along the direction in which the pairs of arms 70 oppose each other when in the closed state. This enables horizontal direction movement of the blank 24 to be restricted by the pairs of arms 70 even if inertial force or the like acts on the blank 24 in the horizontal direction as the blank 24 is being transported by the workpiece transport unit 46, and thus enables the transportation speed of the workpiece transport unit 46 to be increased.

Then, as illustrated in FIG. 4, the third manipulator 44 aligns a locating hole 24A formed in the blank 24 with the locating pin 36B of the lower mold 28. Next, the workpiece transport unit 46 is placed in the open state so as to set the blank 24 in the lower mold 28 of the first press 18. Namely, the blank 24 is placed on the apex face 32A of the punch section 32 and the locating pin 36B is inserted into the locating hole 24A.

When this is performed, the plural arm drivers 88 (see FIG. 6) are controlled to so as to vary the swing start timing and swing speeds of the pairs of arms 70, thus enabling the orientation of the blank 24 set on the lower mold 28 of the first press 18 to be stabilized.

Note that as illustrated in FIG. 4, the dimension 110 in the height direction 109 from the upper face 30A of the base section 30 of the lower mold 28 to the apex face 32A of the punch section 32 is smaller than the dimension 108 from the second placement surfaces 102A of the second hooks 102 to the first placement surfaces 100A of the first hooks 100. The dimension 108 is larger than a dimension obtained by adding together the dimension 110, the height direction dimension 112 of the locating pin 36B, and a tolerance margin.

Accordingly, even were the second height 124 (see FIG. 9) of the first-stage molded article 120 when the first-stage molded article 120 is transported from the first press 18 to the transport table 16 as described later to be the same as the first height 122 (see FIG. 9) of the blank 24 when the blank 24 is transported from the transport table 16 to the first press 18, the blank 24 can be suppressed from interfering with the locating pin 36B when the blank 24 is set in the lower mold 28.

Then, after the blank 24 has been set in the first press 18, the workpiece transport unit 46 is raised and stands by in the vicinity of the first press 18 while remaining in the open state 94.

The post-first heating transport process is an example of a "a first transport process of closing the pair of arms to achieve a state in which the first workpiece is placed on the first placement surfaces and moving the workpiece transport unit so as to transport the first workpiece" of the present disclosure.

First Pressing Process

In the first pressing process, the blank 24 is hot pressed by the lower mold 28 and the upper mold of the first press 18. When this is performed, heat from the blank 24 is rapidly removed by the lower mold 28 and the upper mold so as to perform a first quenching, and the three-dimensional shaped first-stage molded article 120 is formed from the blank 24.

The first-stage molded article 120 is formed with a hat-shaped cross-section profile as an example of a three-dimensional shape.

As illustrated in FIG. 5, after the lower mold 28 and the upper mold of the first press 18 have been opened up, the first-stage molded article 120 is raised by the lifter 36.

Post-First Pressing Transport Process

In the post-first pressing transport process, the workpiece transport unit 46 that has been standing by in the vicinity of the first press 18 while remaining in the open state 94 is moved to above the first-stage molded article 120. When this is performed, since the pairs of arms 70 extend in the horizontal direction when the workpiece transport unit 46 is in the open state 94, the workpiece transport unit 46 can be moved horizontally while suppressing interference between the pairs of arms 70 and the lower mold 28 and the like. Since the movement path is shorter than in a case in which the movement path is adjusted to avoid interference, the movement time can be shortened.

After adjusting the height of the workpiece transport unit 46, the workpiece transport unit 46 is placed in the closed state 92. The first-stage molded article 120 that has been raised by the lifter 36 is thus placed on the second placement surfaces 102A formed to the pairs of second hooks 102. When this is performed, the height of the workpiece transport unit 46 is adjusted such that the leading ends of the pairs of arms 70 do not interfere with the base section 30 of the lower mold 28. Moreover, the angles of the pairs of arms 70 are adjusted so as to stably support the first-stage molded article 120.

In this manner, the pairs of second hooks 102 can be inserted to the lower side of the first-stage molded article 120 simply by swinging the pairs of arms 70 in a closing direction such that the first-stage molded article 120 is placed on the second placement surfaces 102A of the pairs of second hooks 102. This enables the mechanisms of the workpiece transport unit 46 to be simplified and also enables the amount of time needed to open and close the pairs of arms 70 to be shortened in comparison for example to cases in which the pairs of arms 70 employ a slide mechanism in order to slide in the horizontal direction.

Moreover, the three-dimensional shaped first-stage molded article 120 has a narrower lateral width than the flat plate shaped blank 24. Accordingly, employing the second hooks 102 that are longer than the first hooks 100 enables the first-stage molded article 120 to be placed on the second placement surfaces 102A of the pairs of second hooks 102.

Moreover, the pairs of second hooks 102 that support the three-dimensional shaped first-stage molded article 120 are provided at the leading end portions of the arms 70. This enables a space to be secured to the upper side of the pairs of second hooks 102, enabling the first-stage molded article 120 to be accommodated even if the first-stage molded article 120 has a large dimension in the height direction.

Next, in the post-first pressing transport process, the workpiece transport unit 46 is moved to above the transport table 16 using the third manipulator 44 illustrated in FIG. 1. When this is performed, the third manipulator 44 is actuated so as to move the workpiece transport unit 46 along the direction in which the pairs of arms 70 oppose each other when in the closed state. This enables horizontal direction movement of the first-stage molded article 120 to be restricted by the pairs of arms 70, even if inertial force or the like acts on the first-stage molded article 120 in the horizontal direction as the first-stage molded article 120 is being transported by the workpiece transport unit 46, and thus enables the transportation speed of the workpiece transport unit 46 to be increased.

Then, when the workpiece transport unit 46 has been moved to above the transport table 16, the workpiece transport unit 46 is placed in the open state so as to place the first-stage molded article 120 on the transport table 16. The workpiece transport unit 46 then stands by in the open state at the position where it was placed in the open state.

Figure 9:
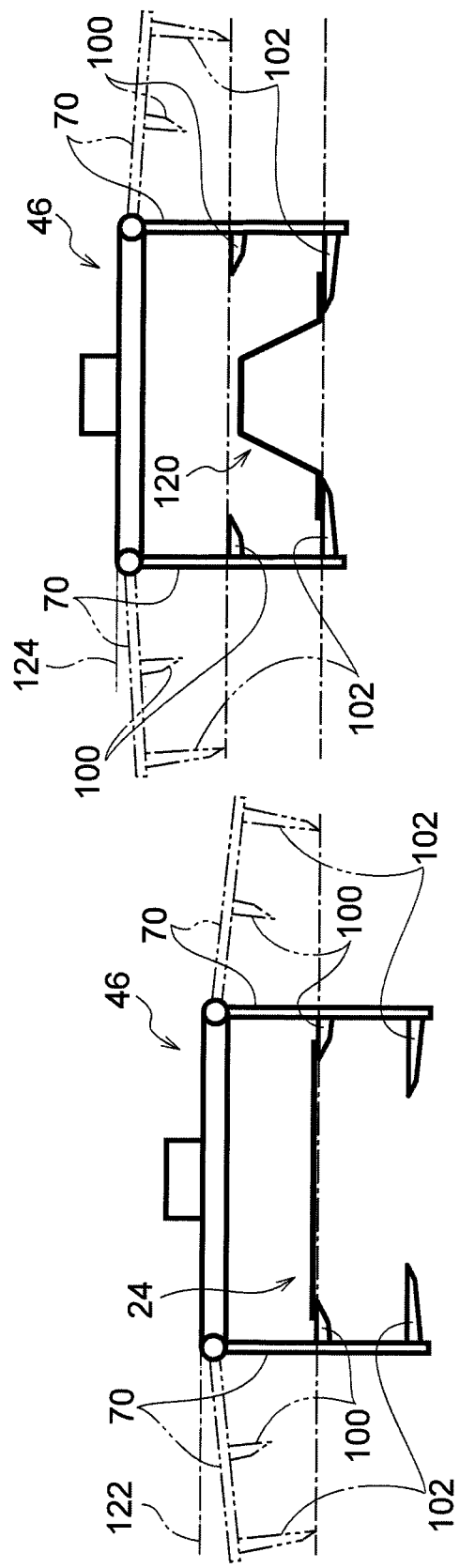
FIG. 9 is a diagram comparing a first height when transporting a blank against a second height when transporting a first-stage molded article using a workpiece transport unit according to the first exemplary embodiment in front view.

FIG. 9 illustrates a comparison between the first height 122 of the workpiece transport unit 46 when the blank 24 is transported during the post-first heating transport process described above, and the second height 124 of the workpiece transport unit 46 when the first-stage molded article 120 is transported during the post-first pressing transport process. As illustrated, the height at which the first-stage molded article 120 is transported during the post-first pressing transport process is the same as the height at which as the blank 24 is transported during the post-first heating transport process.

Namely, the height of the second placement surfaces 102A during the post-first pressing transport process is set to the same height as the height of the first placement surfaces 100A during the post-first heating transport process. Accordingly, the first height 122 of the blank 24 when the blank 24 is transported from the transport table 16 to the first press 18 is the same as the second height 124 of the first-stage molded article 120 when the first-stage molded article 120 is transported from the first press 18 to the transport table 16.

In the post-first pressing transport process, the first-stage molded article 120 is placed on the pairs of second hooks 102 that are positioned further toward the lower side than the pairs of first hooks 100 when retrieving the first-stage molded article 120 from the first press 18. Accordingly, the lowering distance required in order to retrieve the first-stage molded article 120 from the first press 18 can be shortened in comparison to for example cases in which the first-stage molded article 120 is placed on the pairs of first hooks 100. Moreover, a lowering operation when passing the first-stage molded article 120 to the transport table 16 can be eliminated. This enables the time taken to raise and lower the workpiece transport unit 46, and therefore the time taken to transport the first-stage molded article 120 from the first press 18 to the heating furnace 14, to be shortened.

The post-first pressing transport process is an example of a "a second transport process of closing the pair of arms to achieve a state in which the second workpiece is placed on the second placement surfaces and moving the workpiece transport unit so as to transport the second workpiece" of the present disclosure.

Second Heating Process

In the second heating process, the plural rollers 26 provided at the transport table 16 illustrated in FIG. 1 and the plural rollers provided at the heating furnace 14 are rotated in order to move the first-stage molded article 120 into the heating furnace 14. The first-stage molded article 120 is then heated inside the heating furnace 14.

After the first-stage molded article 120 has been heated, the plural rollers 26 provided at the transport table 16 and the plural rollers provided at the heating furnace 14 are rotated. The first-stage molded article 120 is thereby moved onto the transport table 16, such that the first-stage molded article 120 is disposed below the workpiece transport unit 46 that has been standing by above the transport table 16.

Post-Second Heating Transport Process

In the post-second heating transport process, the workpiece transport unit 46 that has been standing by above the transport table 16 in the open state is placed in the closed state while maintaining the same height. Note that the workpiece transport unit 46 stands by in the open state at the position where it was placed in the open state when the blank 24 was passed to the transport table 16 in the post-first pressing transport process as described previously.

Accordingly, in the post-second heating transport process, the first-stage molded article 120 on the transport table 16 can be placed on the second placement surfaces 102A formed to the pairs of second hooks 102 by placing the workpiece transport unit 46 in the closed state while maintaining the same height, without performing a lowering operation or the like of the workpiece transport unit 46. This enables the amount of time taken to transport the first-stage molded article 120 from the heating furnace 14 to the second press 20 to be shortened.

Next in the post-second heating transport process, the workpiece transport unit 46 is moved to the second press 20 by the third manipulator 44 illustrated in FIG. 1. When this is performed, the third manipulator 44 is actuated so as to move the workpiece transport unit 46 along the direction in which the pairs of arms 70 oppose each other when in the closed state. This enables horizontal direction movement of the first-stage molded article 120 to be restricted by the pairs of arms 70, even if inertial force or the like acts on the first-stage molded article 120 in the horizontal direction as the first-stage molded article 120 is being transported by the workpiece transport unit 46, and thus enables the transportation speed of the workpiece transport unit 46 to be increased.

Then, as illustrated in FIG. 5, the third manipulator 44 aligns the locating hole 24A formed in the first-stage molded article 120 with the locating pin 36B of the lower mold 28. Next, the workpiece transport unit 46 is placed in the open state so as to set the first-stage molded article 120 in the lower mold 28 of the second press 20. Namely, the first-stage molded article 120 is placed on the apex face 32A of the punch section 32 and the locating pin 36B is inserted into the locating hole 24A.

After the first-stage molded article 120 has been set in the second press 20, the workpiece transport unit 46 is returned to its initial position.

The post-second heating transport process is an example of a "second transport process of closing the pair of arms to achieve a state in which the second workpiece is placed on the second placement surfaces and moving the workpiece transport unit so as to transport the second workpiece" of the present disclosure.

Second Pressing Process

In the second pressing process, the first-stage molded article 120 is hot pressed by the lower mold 28 and the upper mold of the second press 20. When this is performed, heat from the first-stage molded article 120 is rapidly removed by the lower mold 28 and the upper mold in order to perform a second quenching, and the second-stage molded article 130 is formed from the first-stage molded article 120. The shape of the second-stage molded article 130 may be the final shape.

As illustrated in FIG. 5, after the lower mold 28 and the upper mold of the second press 20 have been opened up, the second-stage molded article 130 is raised by the lifter 36.

Post-Second Pressing Transport Process

In the post-second pressing transport process, the second manipulator 42 is used to remove the second-stage molded article 130 from the second press 20 and transport the second-stage molded article 130 for subsequent processing.

Note that although explanation has been given regarding a case in which the first hooks 100 and the second hooks 102 of the workpiece transport unit 46 are employed to transport the flat plate shaped blank 24 and the three-dimensional shaped first-stage molded article 120 and second-stage molded article 130, the present disclosure is not limited thereto.

Figure 10:
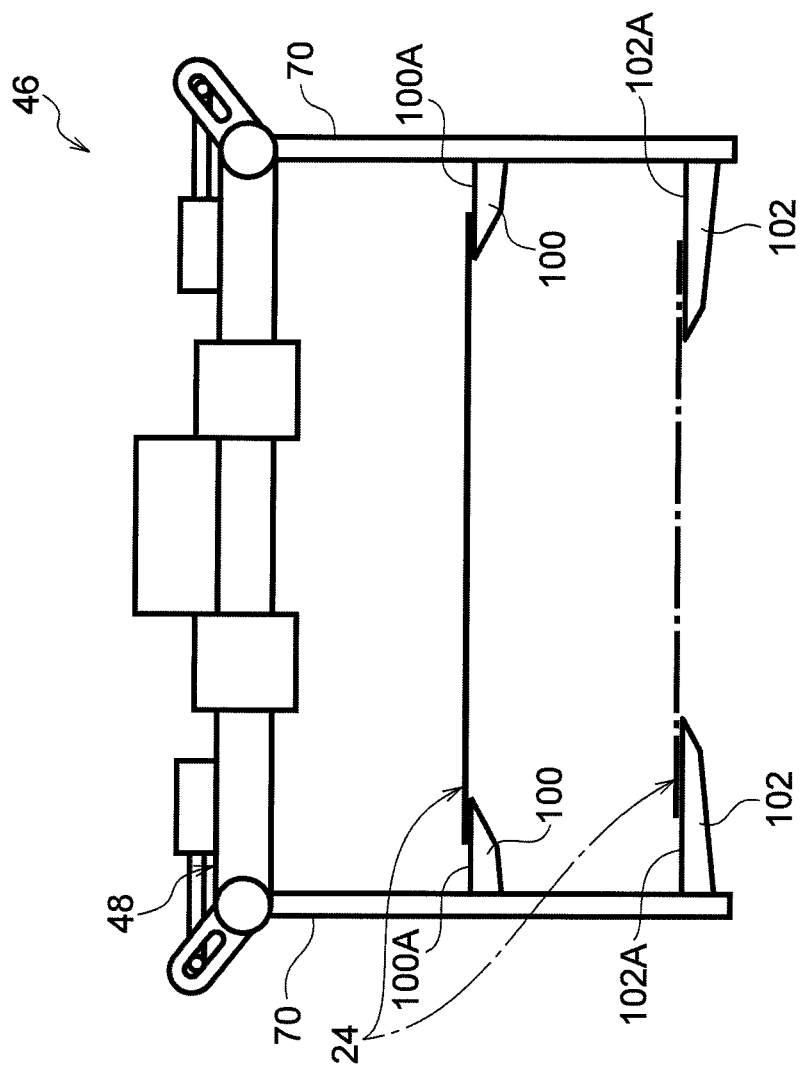
FIG. 10 is a front view illustrating an example of transportation of a blank using first hooks or second hooks.
Figure 11:
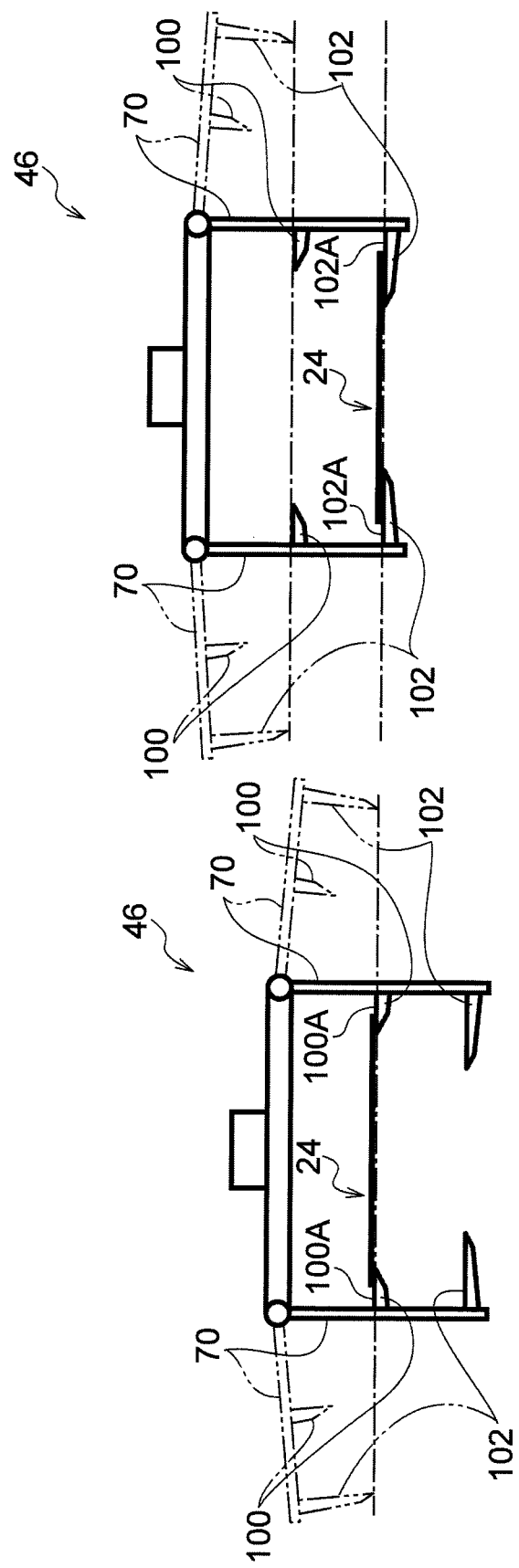
FIG. 11 is a diagram comparing a first height when transporting a blank using first hooks against a second height when transporting a blank using second hooks in front view.

For example, as illustrated in FIG. 10, the first hooks 100 and the second hooks 102 of the workpiece transport unit 46 may be employed to transport the flat plate shaped blank 24 only. In such cases, there is no need to vary of the transportation height of the workpiece transport unit 46 as illustrated in FIG. 11.

In the hot pressing method described above, either heating process out of the first heating process and the second heating process may be omitted depending on the shape and characteristics of the desired second-stage molded article 130.

Operation and Advantageous Effects

Next, explanation follows regarding operation and advantageous effects of the first exemplary embodiment.

The workpiece transport unit 46 includes the pairs of arms 70 and the opening/closing mechanisms 62 that open and close the pairs of arms 70 in the horizontal direction. Each pair of arms 70 is respectively provided with the pair of first hooks 100 on which the blank 24 is placed, and each pair of arms 70 is also respectively provided with the pair of second hooks 102 on which the first-stage molded article 120 or the second-stage molded article 130 is placed. This thereby enables workpieces of different shapes (the blank 24 and the first-stage molded article 120 or second-stage molded article 130) to be held and transported by the workpiece transport unit 46.

Moreover, the pairs of arms 70 open and close in the horizontal direction. In the closed state of the pairs of arms 70, the blank 24 supported by the pairs of first hooks 100 is alongside each pair of arms 70 in the horizontal direction. This enables horizontal direction movement of the blank 24 to be restricted by the pairs of arms 70, even if inertial force or the like acts on the blank 24 in the horizontal direction as the blank 24 is being transported by the workpiece transport unit 46, and thus enables the transportation speed of the workpiece transport unit 46 to be increased.

Similarly, in the closed state of the pairs of arms 70, the first-stage molded article 120 supported by the pairs of second hooks 102 is alongside each pair of arms 70 in the horizontal direction. This enables horizontal direction movement of the first-stage molded article 120 to be restricted by the pairs of arms 70, even if inertial force or the like acts on the first-stage molded article 120 in the horizontal direction as the first-stage molded article 120 is being transported by the workpiece transport unit 46, and thus enables the transportation speed of the workpiece transport unit 46 to be increased.

Moreover, each pair of first hooks 100 extend toward the inner side of the pair of arms 70 that oppose each other in the horizontal direction when in the closed state 92, namely toward the mutually opposing arm 70 of the pair of arms 70 that oppose each other. Accordingly, in a state in which the edges of the blank 24 are being supported by the pairs of first hooks 100, the pairs of arms 70 are positioned on both sides of the blank 24 in the horizontal direction, thereby enabling horizontal direction movement of the blank 24 toward either side to be restricted by the pairs of arms 70. Moreover, providing a tolerance margin in the length of the pairs of first hooks 100 enables blanks 24 with different widths to be supported by the pairs of first hooks 100.

Similarly, each pair of second hooks 102 extend toward the mutually opposing arm 70 of the pair of arms 70 that oppose each other in the horizontal direction when in the closed state 92. Accordingly, in a state in which the edges of the first-stage molded article 120 are being supported by the pairs of second hooks 102, the pairs of arms 70 are positioned on both sides of the first-stage molded article 120 in the horizontal direction, thereby enabling horizontal direction movement of the first-stage molded article 120 toward either side to be restricted by the pairs of arms 70. Moreover, providing a tolerance margin in the length of the pairs of second hooks 102 enables first-stage molded articles 120 with different widths to be supported by the pairs of second hooks 102.

Moreover, the workpiece can be held by the workpiece transport unit 46 by supporting the workpiece from the lower side using the pairs of first hooks 100 or the pairs of second hooks 102. This enables the workpiece to be held at higher temperatures than for example when employing a configuration in which a workpiece is held using suction or magnetism.

Moreover, the pairs of first hooks 100 that support the flat plate shaped blank 24 are provided between the leading end portions and the base end portions of the pairs of arms 70, and the pairs of second hooks 102 that support the three-dimensional shaped first-stage molded article 120 are provided at the leading end portions of the pairs of arms 70. Accordingly, more space can be secured at the upper side of the pairs of second hooks 102 than in a case in which, for example, the three-dimensional shaped first-stage molded article 120 is supported by the pairs of first hooks 100. This thereby enables the first-stage molded article 120 to be held and transported by the workpiece transport unit 46, even if the first-stage molded article 120 has a large dimension in the height direction.

The respective lengths of the pairs of first hooks 100 differ from the respective lengths of the pairs of second hooks 102. This enables the blank 24 to be supported by the pairs of first hooks 100 that each have a length appropriate for the width of the blank 24, and thus enables the contact surface area between the blank 24 and the pairs of first hooks 100 to be reduced when transporting the blank 24 that has been heated in the heating furnace 14 supported by the pairs of first hooks 100. This enables heat from the blank 24 to be suppressed from escaping through the pairs of first hooks 100, and thereby enables temperature unevenness to be suppressed in the blank 24.

Similarly, since the first-stage molded article 120 can be supported by the pairs of second hooks 102 that each have a length appropriate for the width of the first-stage molded article 120, the contact surface area between the first-stage molded article 120 and the pairs of second hooks 102 can be reduced when transporting the first-stage molded article 120 that has been heated in the heating furnace 14 supported by the pairs of second hooks 102. This enables heat from the first-stage molded article 120 to be suppressed from escaping through the pairs of second hooks 102, and thereby enables temperature unevenness to be suppressed in the first-stage molded article 120.

Moreover, the opening/closing mechanism 62 includes the rotation shafts 60 that support the pairs of arms 70 so as to be capable of swinging. Since the pairs of arms 70 extend in the horizontal direction in the open state of the pairs of arms 70, the pairs of arms 70 can be suppressed from interfering with the lower mold 28 and the like as the workpiece transport unit 46 moves. Since the movement path is shorter than in a case in which the movement path is adjusted to avoid interference from the workpiece transport unit, the movement time can be shortened.

In particular, each opening/closing mechanism 62 supports the corresponding pair of arms 70 so as to be openable and closeable in order to adopt either the closed state in which the pair of arms 70 extend in the vertical direction and oppose each other in the horizontal direction, or the open state in which the pair of arms 70 extend in the horizontal direction. This enables both restriction of movement of the workpiece by the pairs of arms 70 and interference of the pairs of arms 70 with the lower mold 28 and the like to be even more effectively implemented.

Moreover, each opening/closing mechanism 62 includes the extension/retraction mechanisms 52B that support the corresponding pair of arms 70 so as to be slideable in the horizontal direction. This enables the horizontal direction spacing between the pair of arms 70 to be adjusted. This enables blanks 24 of different widths to be transported using the workpiece transport unit 46, and also enables first-stage molded articles 120 of different widths to be transported using the workpiece transport unit 46.

Moreover, the height of the second placement surfaces 102A during the post-first pressing transport process is set to the same height as the height of the first placement surfaces 100A during the post-first heating transport process. Accordingly, the first height 122 of the blank 24 when the blank 24 is transported from the transport table 16 to the first press 18 is the same as the second height 124 of the first-stage molded article 120 when the first-stage molded article 120 is transported from the first press 18 to the transport table 16.

In the post-first pressing transport process, when the first-stage molded article 120 is retrieved from the first press 18, the first-stage molded article 120 is placed on the pairs of second hooks 102 that are positioned further toward the lower side than the pairs of first hooks 100. Accordingly, the lowering distance required in order to retrieve the first-stage molded article 120 from the first press 18 can be shortened in comparison to for example cases in which the first-stage molded article 120 is placed on the pairs of first hooks 100. Moreover, a lowering operation when passing the first-stage molded article 120 to the transport table 16 can be eliminated. This enables the time taken to raise and lower the workpiece transport unit 46, and therefore the time taken to transport the first-stage molded article 120 from the first press 18 to the heating furnace 14, to be shortened.

Note that in the first exemplary embodiment, the spacing between each pair of arms 70 supported by the lengthwise members 50 is configured so as to be adjustable by the extension/retraction mechanisms 52B provided at the widthwise members 52 of the workpiece transport unit 46. However, the present disclosure is not limited thereto. For example, an attachment position adjustment mechanism including plural attachment positions for the rotation shafts 60 may be provided at the base frame 48 and used to change the attachment positions of the rotation shafts 60 such that the spacing between each pair of arms 70 is adjustable. Alternatively, the widthwise members 52 may be configured by fixed length rod-shaped members.

Moreover, although the workpiece transport unit 46 of the first exemplary embodiment includes two sets of pairs of the arms 70, any number of pairs of the arms 70 may be provided.

Moreover, although the respective lengths of the pairs of first hooks 100 are set shorter than the respective lengths of the pairs of second hooks 102 as an example, the lengths of the pairs of first hooks 100 may be set longer than the lengths of the pairs of second hooks 102 in a case in which it is necessary to set the lengths of the pairs of first hooks 100 longer than the lengths of the pairs of second hooks 102.

Although the pairs of first hooks 100 are each set to the same length as an example, the lengths thereof may differ. Similarly, although the pairs of second hooks 102 are each set to the same length as an example, the lengths thereof may differ.

Second Exemplary Embodiment

Figure 12:
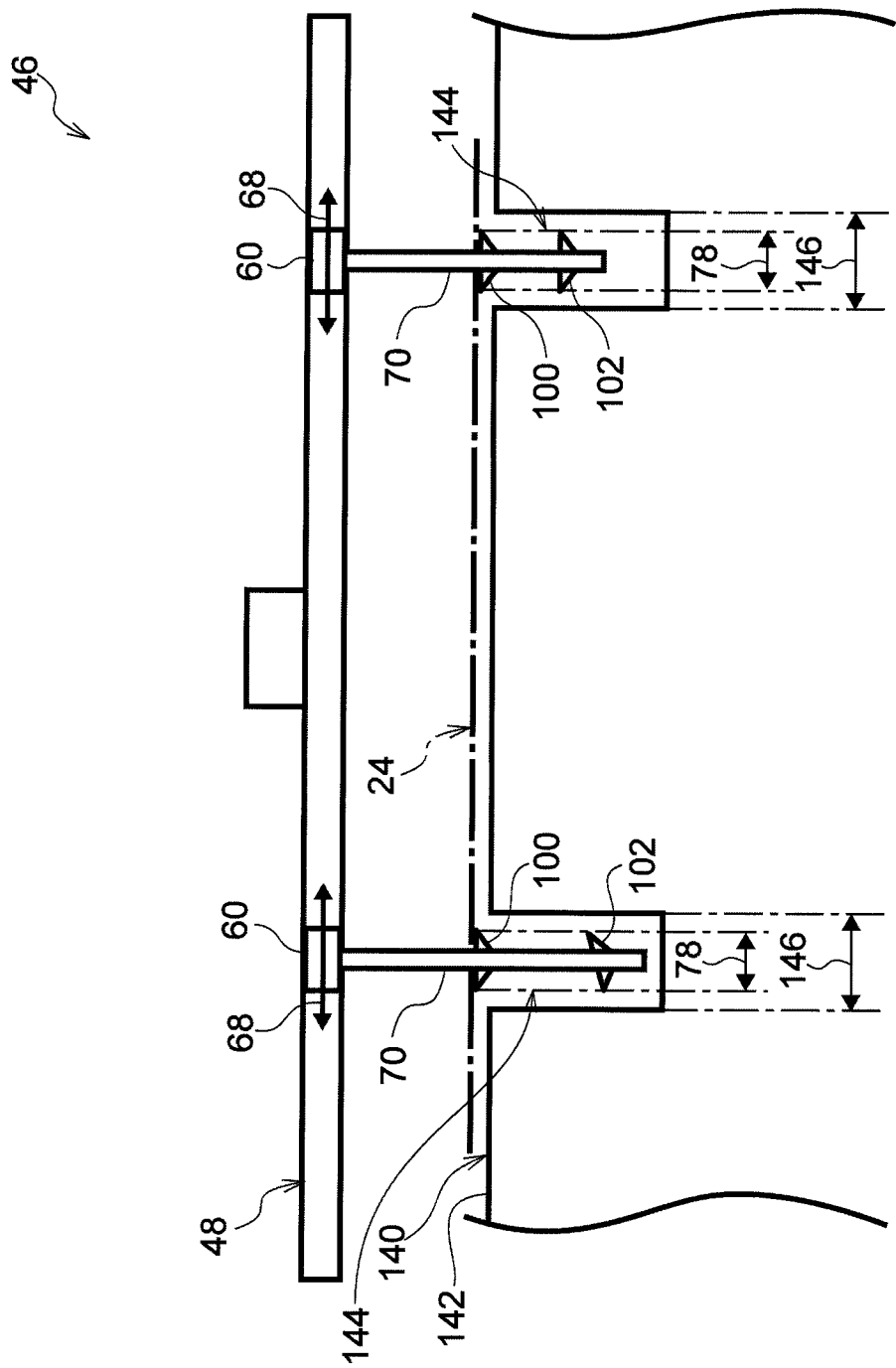
FIG. 12 is a side view illustrating relevant portions of a workpiece transport unit and a transport table according to a second exemplary embodiment.
Figure 13:
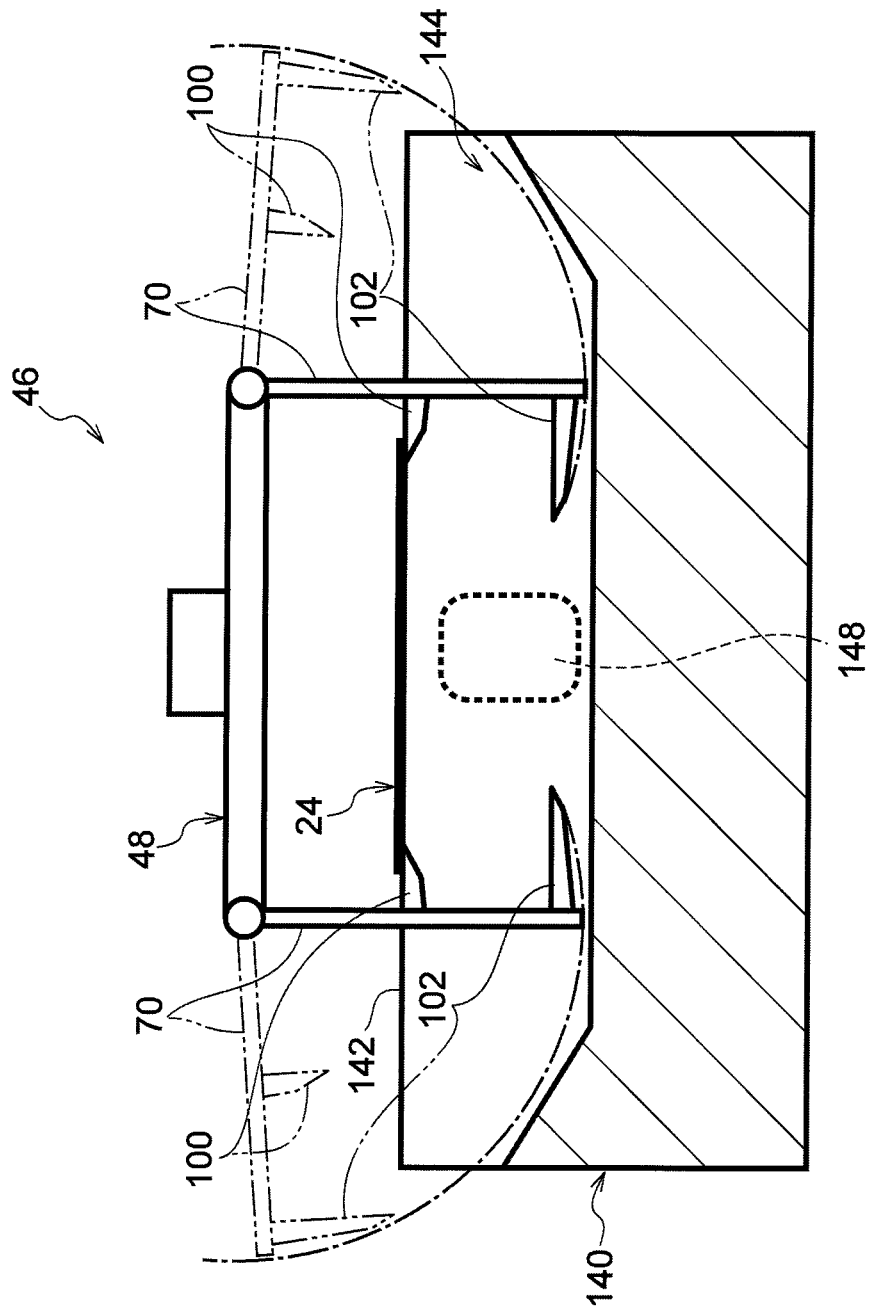
FIG. 13 is a front view cross-section illustrating relevant portions of a workpiece transport unit and a transport table according to the second exemplary embodiment.

FIG. 12 and FIG. 13 are diagrams illustrating a second exemplary embodiment. In the second exemplary embodiment, elements that are the same as or equivalent to those of the first exemplary embodiment are allocated the same reference numerals and explanation thereof is omitted. Explanation follows regarding only elements that differ from those of the first exemplary embodiment.

In the second exemplary embodiment, the transport table 16 of the first exemplary embodiment is replaced by a transport table 140 that does not include the rollers 26. The transport table 140 is connected to the entrance/exit of the heating furnace 14. A top face 142 of the transport table 140 is flat, and the top face 142 is formed with grooves 144 at positions corresponding to the grooves 16B of the transport table 16 of the first exemplary embodiment (see FIG. 2 and FIG. 3).

A width 146 of the grooves 144 is wider than the width 78 of the pairs of arms 70 of the workpiece transport unit 46. Namely, the width 78 of the pairs of arms 70 in the axial direction 68 of the rotation shafts 60 is narrower than the width 146 of the grooves 144.

In the second exemplary embodiment, the width 78 of the pairs of arms 70 in the axial direction 68 of the rotation shafts 60 is narrower than the width 146 of the grooves 144 of the transport table 140. Accordingly, the pairs of first hooks 100 can be disposed at the lower side of a blank 24 disposed on the transport table 140 by inserting the pairs of arms 70 into the corresponding grooves 144.

In the second exemplary embodiment, elements that are the same as or equivalent to those of the first exemplary embodiment enable similar operation and advantageous effects to those of the first exemplary embodiment to be exhibited.

Note that forming the grooves 144 in the top face 142 of the transport table 140 allows a sensor 148 to be installed at a central portion of the grooves 144, as illustrated in FIG. 13. Examples of the sensor 148 include a load presence sensor configured to detect the presence or absence of a workpiece (for example the blank 24) on the transport table 140, a temperature sensor configured to measure the temperature of the workpiece, and a load sensor configured to measure load from the workpiece.

Third Exemplary Embodiment

Figure 14:
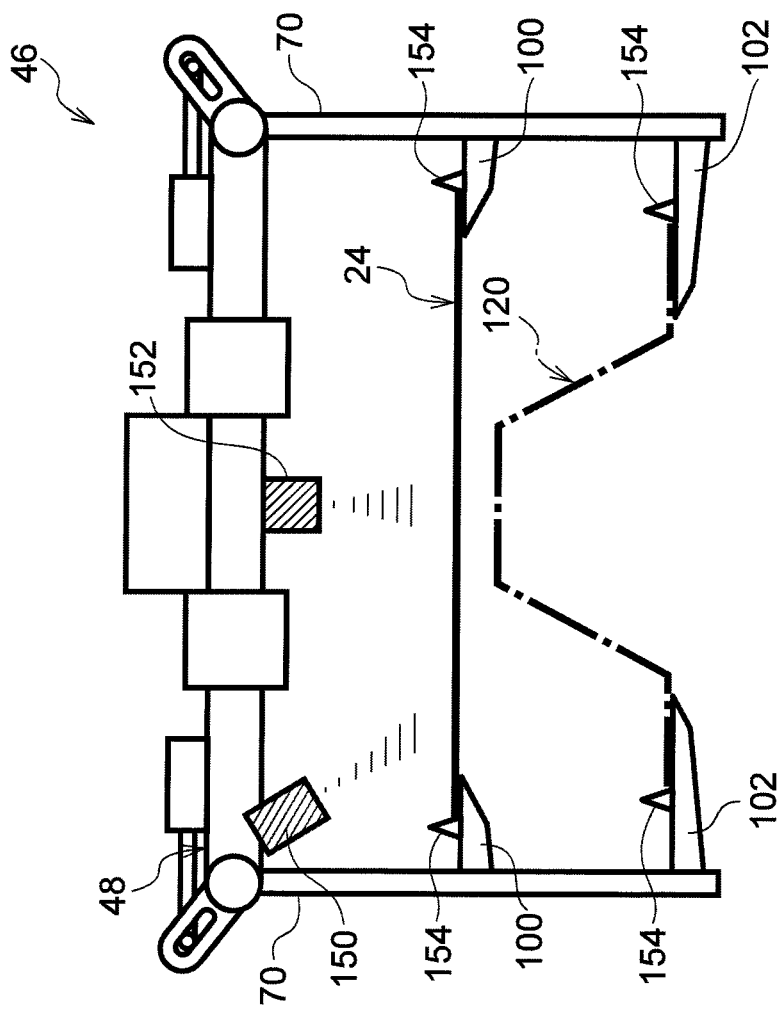
FIG. 14 is a front view illustrating a closed state of a workpiece transport unit according to a third exemplary embodiment.

FIG. 14 and FIG. 15 are diagrams illustrating a third exemplary embodiment. In the third exemplary embodiment, elements that are the same as or equivalent to those of the first exemplary embodiment are allocated the same reference numerals and explanation thereof is omitted. Explanation follows regarding only elements that differ from those of the first exemplary embodiment.

In the third exemplary embodiment, a shape sensor 150 and a temperature sensor 152 are provided at the base frame 48. Moreover, the pairs of first hooks 100 and the pairs of second hooks 102 are each provided with a positioning guide 154 to position the workpiece at a holding position.

The shape sensor 150 is provided at an edge of the base frame 48 and is a sensor for determining the shape of a workpiece. An example of the shape sensor 150 is a distance sensor configured to measure a distance to the workpiece. If employing a distance sensor, in a case in which the distance to the workpiece is short, the workpiece is determined to be the blank 24, and in a case in which the distance to the workpiece is longer, the workpiece is determined to be a molded article (for example the first-stage molded article 120). The temperature sensor 152 is provided at a central portion of the base frame 48 and is configured to measure the temperature of the workpiece.

As illustrated in FIG. 15, the transportation height of the workpiece transport unit 46 may be selected based on a determination result of the shape sensor 150. Moreover, a thermal expansion rate of the workpiece may be computed based on the temperature of the workpiece measured by the temperature sensor 152 and a rotation angle of the pairs of arms 70 may be adjusted in consideration of the thermal expansion of the workpiece. This enables the positioning precision of the positioning guides 154 to be improved.

In the third exemplary embodiment, elements that are the same as or equivalent to those of the first exemplary embodiment enable similar operation and advantageous effects to those of the first exemplary embodiment to be exhibited.

Fourth Exemplary Embodiment

Figure 16:
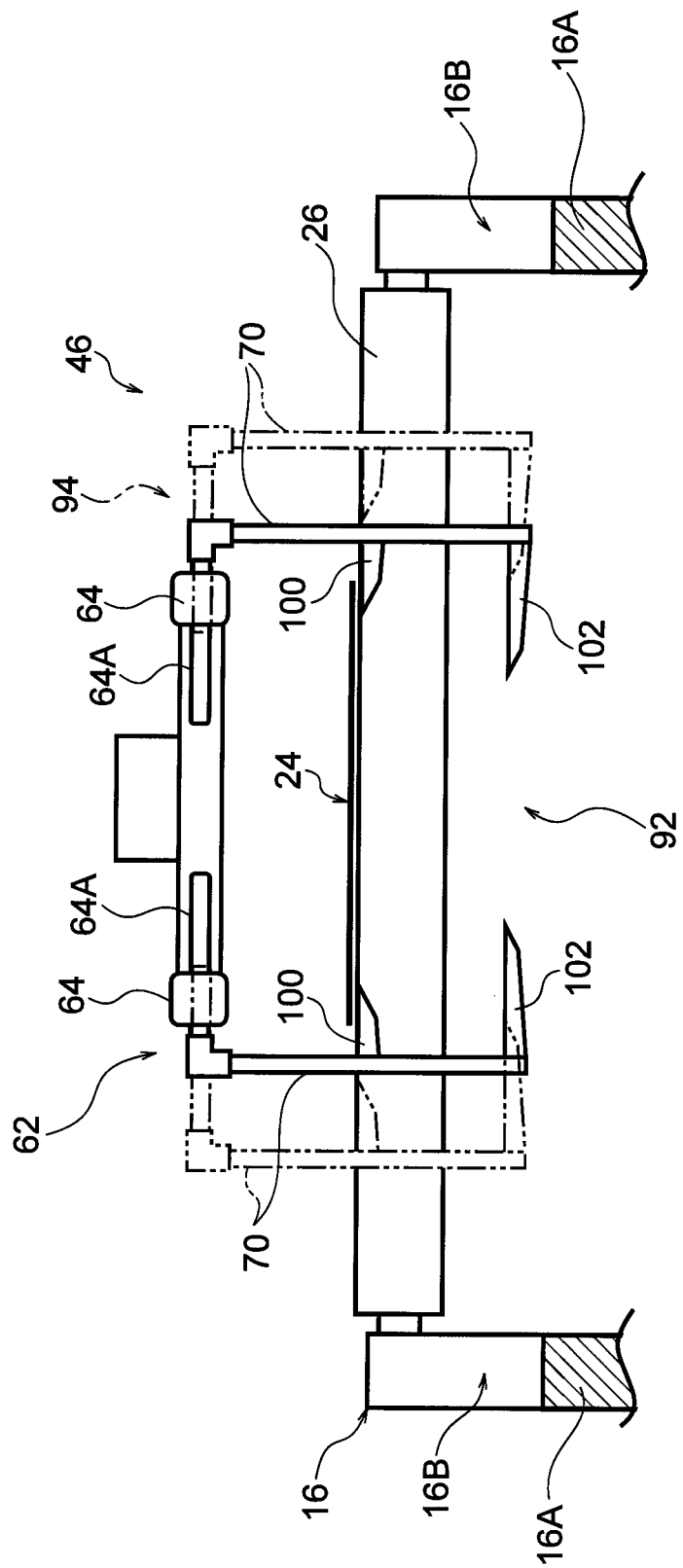
FIG. 16 is a front view cross-section illustrating relevant portions of a workpiece transport unit and a transport table according to a fourth exemplary embodiment.
Figure 17:
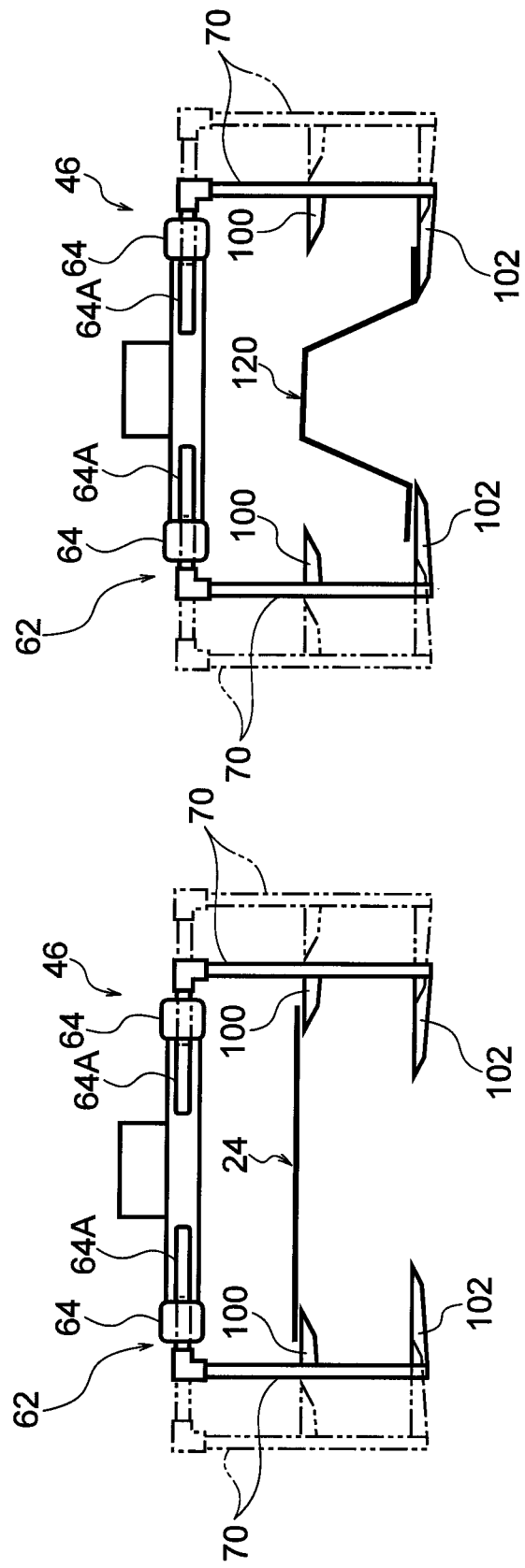
FIG. 17 is a diagram comparing a state in which a blank is held and a state in which a first-stage molded article is held by a workpiece transport unit according to the fourth exemplary embodiment in front view.

FIG. 16 and FIG. 17 are diagrams illustrating a fourth exemplary embodiment. In the fourth exemplary embodiment, elements that are the same as or equivalent to those of the first exemplary embodiment are allocated the same reference numerals and explanation thereof is omitted. Explanation follows regarding only elements that differ from those of the first exemplary embodiment.

In the fourth exemplary embodiment, each opening/closing mechanism 62 includes extension/retraction mechanisms 64 that support the corresponding pair of arms 70 in the horizontal direction so as to be slideable. Each of the extension/retraction mechanisms 64 includes a slide shaft 64A configured to slide along the horizontal direction. The extension/retraction mechanisms 64 are capable of causing the respective slide shafts 64A to slide. Examples of the extension/retraction mechanisms 64 include electric actuators, pneumatic actuators, hydraulic actuators, and the like. The slide shafts 64A are connected to base end portions of the corresponding arms 70. In the opening/closing mechanism 62, the corresponding pair of arms 70 are opened and closed in the horizontal direction by this sliding of the slide shafts 64A.

In the fourth exemplary embodiment, since the pairs of first hooks 100 move horizontally when closing the pairs of arms 70, the pairs of first hooks 100 can be inserted to the lower side of the blank 24 even if the blank 24 is only lifted by a short height from the lower mold by the lifter. Similarly, the pairs of second hooks 102 can be inserted to the lower side of the first-stage molded article 120 even if the first-stage molded article 120 is only lifted by a short height from the lower mold by the lifter.

Moreover, since the pairs of first hooks 100 move horizontally when opening the pairs of arms 70, a drop distance of the blank 24 from the pairs of first hooks 100 can be shortened when passing the blank 24 to the lower mold. Similarly a drop distance of the first-stage molded article 120 from the pairs of second hooks 102 can be shortened when passing the first-stage molded article 120 to the lower mold.

In the fourth exemplary embodiment, elements that are the same as or equivalent to those of the first exemplary embodiment enable similar operation and advantageous effects to those of the first exemplary embodiment to be exhibited.

Fifth Exemplary Embodiment

Figure 18:
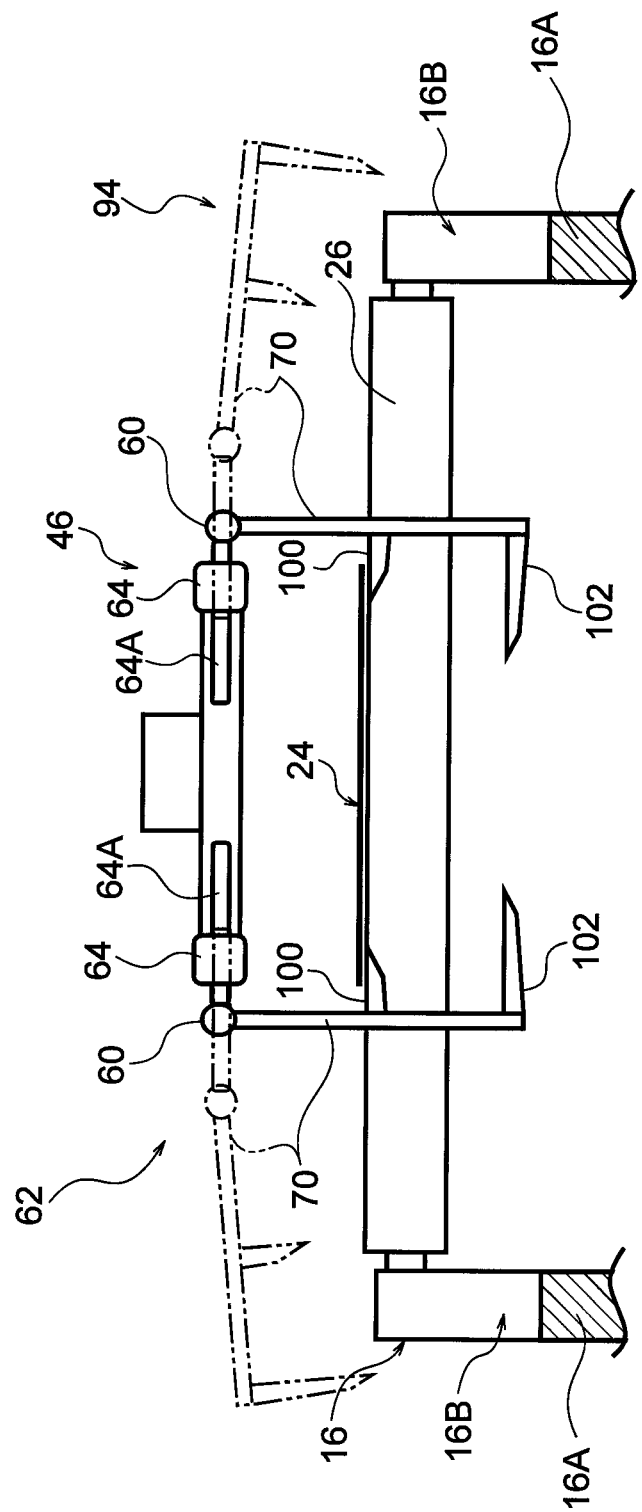
FIG. 18 is a front view cross-section illustrating relevant portions of a workpiece transport unit and a transport table according to a fifth exemplary embodiment.

FIG. 18 is a diagram illustrating a fifth exemplary embodiment. In the fifth exemplary embodiment, elements that are the same as or equivalent to those of the first exemplary embodiment are allocated the same reference numerals and explanation thereof is omitted. Explanation follows regarding only elements that differ from those of the first exemplary embodiment.

In the fifth exemplary embodiment, each opening/closing mechanism 62 is configured by a combination of the extension/retraction mechanisms 64 of the fourth exemplary embodiment described above and the rotation shafts 60. The opening/closing mechanism 62 further includes the arm drivers 88 (see FIG. 6) of the first exemplary embodiment described above. The opening/closing mechanism 62 is thus capable of both swinging the corresponding pair of arms 70 and sliding the arms 70 in the horizontal direction.

In the fifth exemplary embodiment, in the open state of the pairs of arms 70, the pairs of arms 70 have swung so as to adopt a state extending along the horizontal direction, thereby enabling a raising distance to move the workpiece transport unit 46 out of the way to be shortened.

Moreover, since the pairs of arms 70 are made to slide in the horizontal direction when inserting the pairs of first hooks 100 to the lower side of the blank 24, the pairs of first hooks 100 can be inserted to the lower side of the blank 24 even if the blank 24 is only lifted by a short height from the lower mold by the lifter. Similarly, the pairs of second hooks 102 can be inserted to the lower side of the first-stage molded article 120 even if the first-stage molded article 120 is only lifted by a short height from the lower mold by the lifter.

Moreover, since pairs of the arms 70 are made to slide such that the pairs of first hooks 100 move horizontally when opening the pairs of arms 70, a drop distance of the blank 24 from the pairs of first hooks 100 can be shortened when passing the blank 24 to the lower mold. Similarly, a drop distance of the first-stage molded article 120 from the pairs of second hooks 102 can be shortened when passing the first-stage molded article 120 to the lower mold.

In the fifth exemplary embodiment, elements that are the same as or equivalent to those of the first exemplary embodiment enable similar operation and advantageous effects to those of the first exemplary embodiment to be exhibited.

Modified Examples

Next, explanation follows regarding modified examples of the first exemplary embodiment to the fifth exemplary embodiment.

Although the workpiece transport unit 46 includes two sets of the pair of arms 70 in the first exemplary embodiment to the fifth exemplary embodiment, any number of pairs of arms 70 may be provided.

Moreover, although the lengths of the pairs of first hooks 100 are set shorter than the lengths of the pairs of second hooks 102 as an example, the lengths of the pairs of first hooks 100 may be set longer than the lengths of the pairs of second hooks 102 in a case in which it is necessary to set the lengths of the pairs of first hooks 100 longer than the lengths of the pairs of second hooks 102.

Although the pairs of first hooks 100 are each set to the same length as an example, the lengths thereof may differ. Similarly, although the pairs of second hooks 102 are each set to the same length as an example, the lengths thereof may differ.

Figure 19:
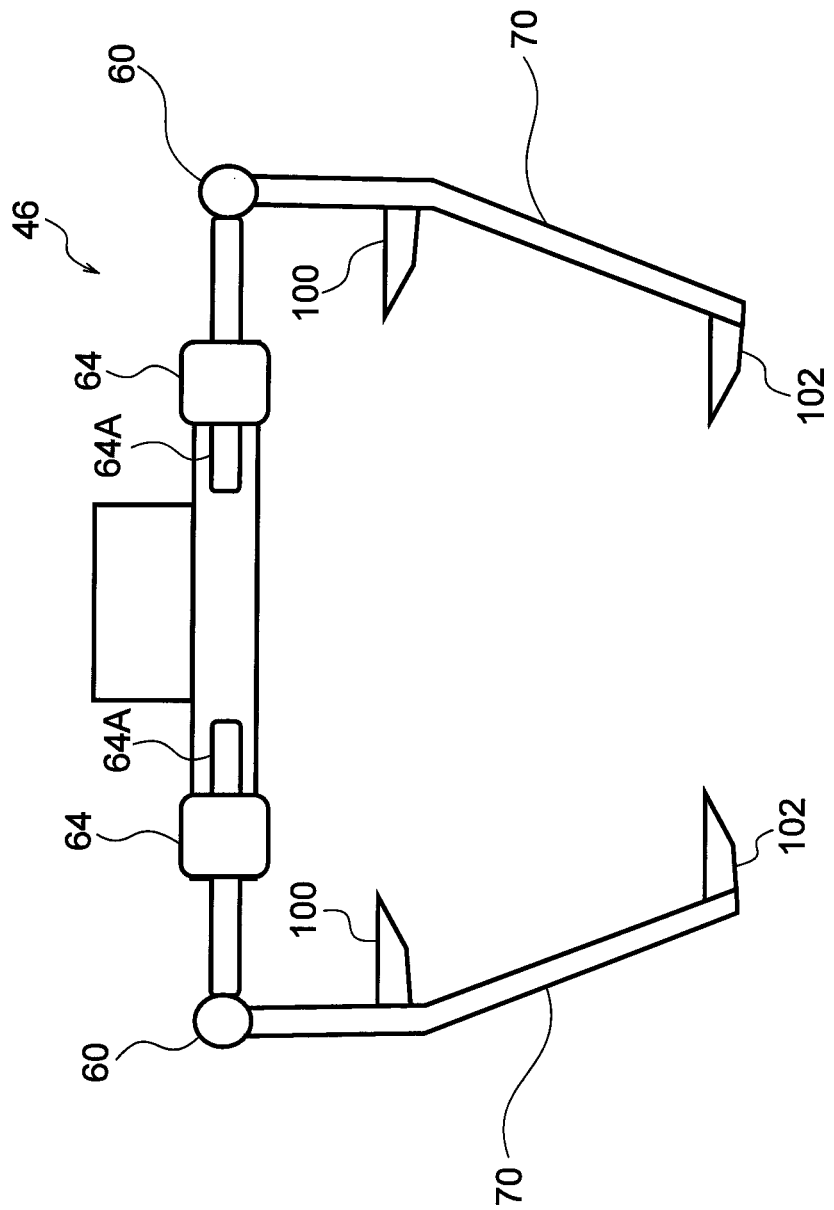
FIG. 19 is a front view illustrating a workpiece transport unit according to a first modified example.
Figure 20:
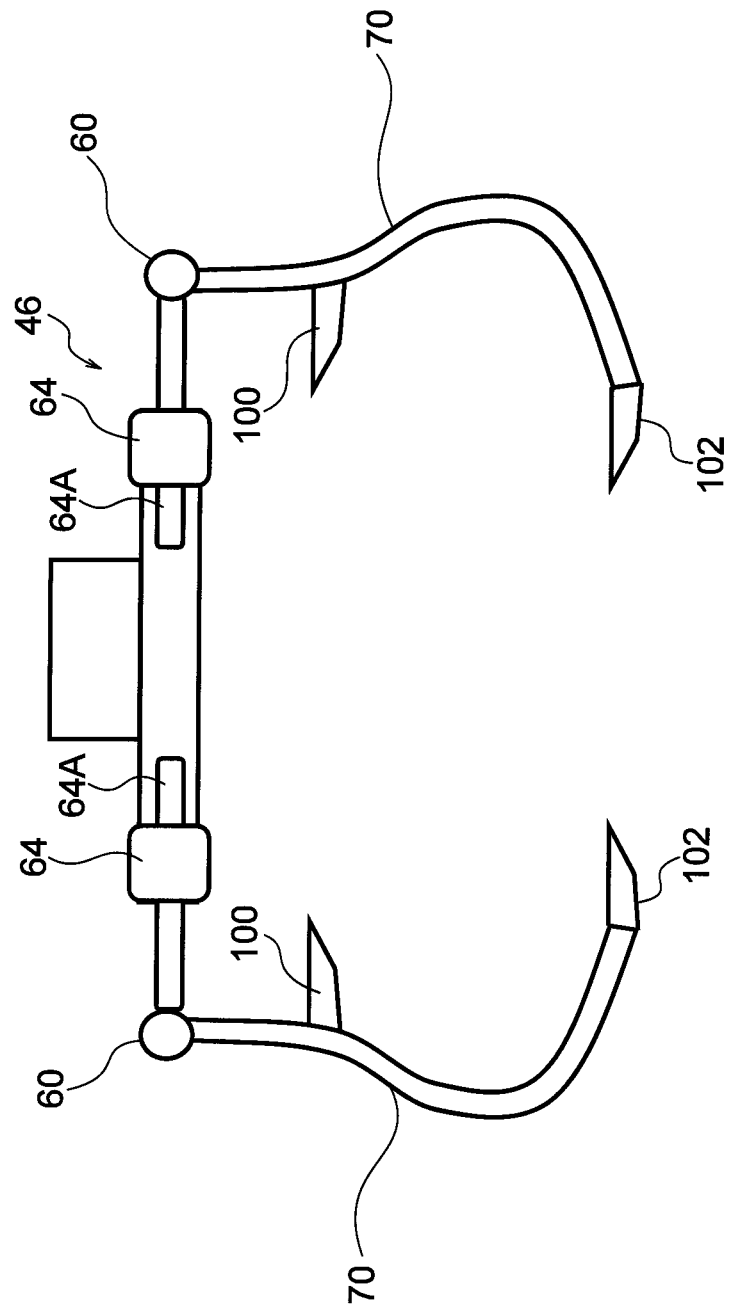
FIG. 20 is a front view illustrating a workpiece transport unit according to a second modified example.

Moreover, as illustrated in FIG. 19, each pair of arms 70 may have a bent profile. Alternatively, as illustrated in FIG. 20, each pair of arms may have a curved profile. Each pair of arms 70 may be configured with a bent profile or a curved profile so as to avoid interference with other components or the die.

Figure 21:
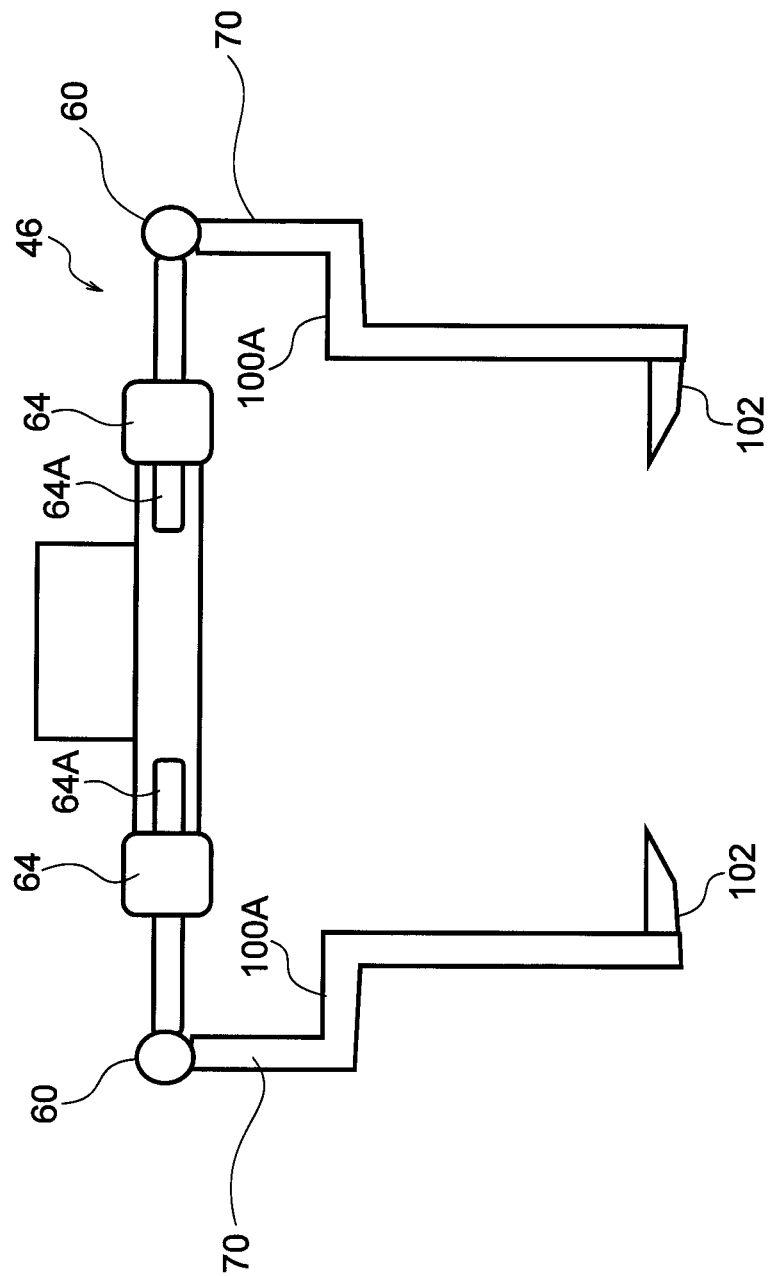
FIG. 21 is a front view illustrating a workpiece transport unit according to a third modified example.
Figure 22:
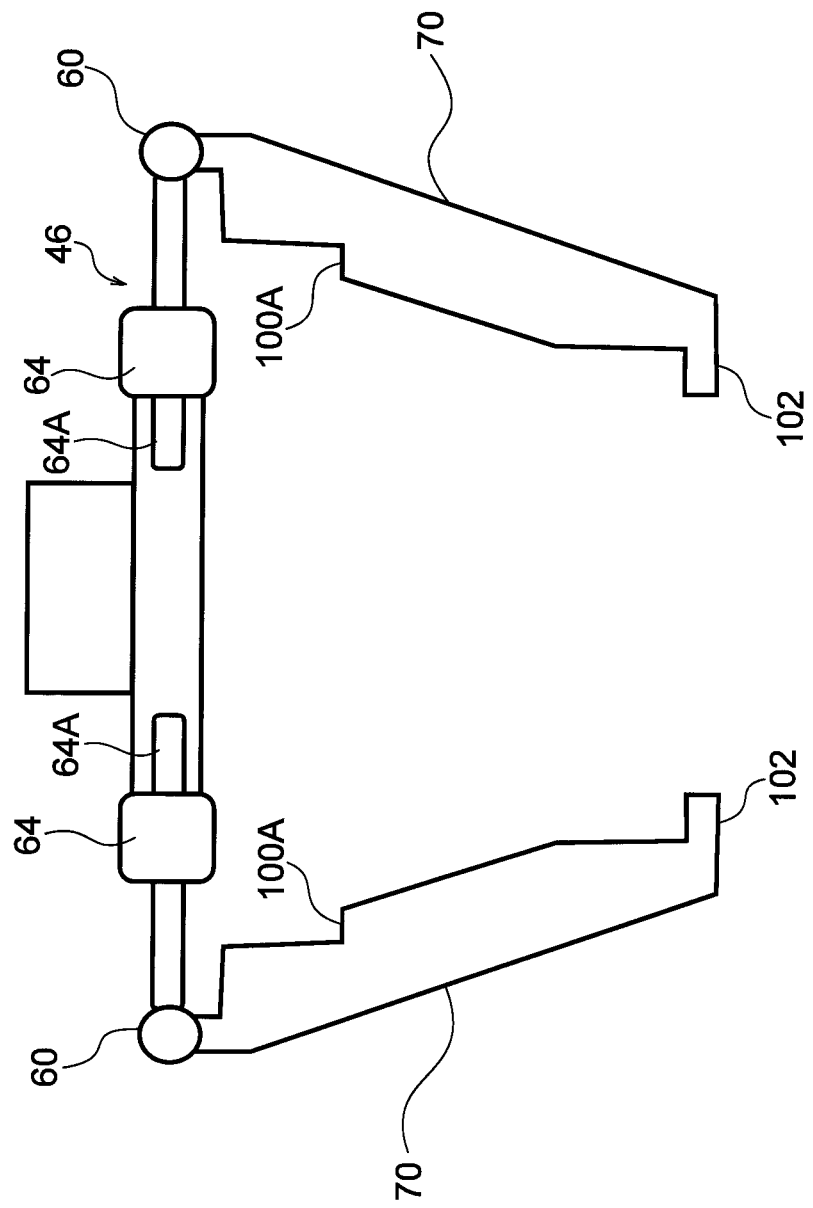
FIG. 22 is a front view illustrating a workpiece transport unit according to a fourth modified example.

Alternatively, as illustrated in FIG. 21 and FIG. 22, instead of the pair of first hooks 100, a pair of steps may be formed to each pair of arms 70, and a pair of first placement surfaces 100A may be formed to the pair of steps. As illustrated in FIG. 22, each pair of arms 70 may be formed by folding sheet metal.

Integrally forming the pair of first placement surfaces 100A to each pair of arms 70 as illustrated in FIG. 21 enables a reduction in the number of components, thereby enabling a reduction in weight of the workpiece transport unit 46. Integrally forming the pair of first placement surfaces 100A and a pair of second placement surfaces 102A to each pair of arms 70 as illustrated in FIG. 22 enables a further reduction in the number of components, thereby enabling a further reduction in weight of the workpiece transport unit 46.

Figure 23:
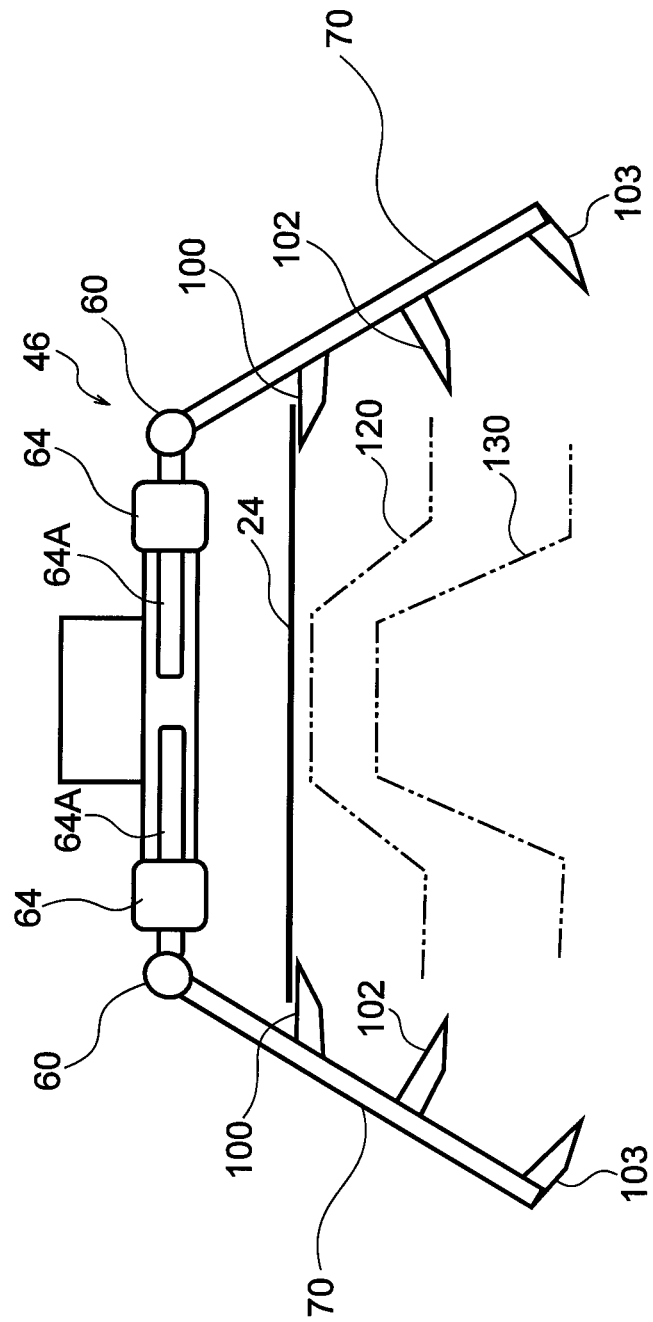
FIG. 23 is a front view illustrating a first example of operation of a workpiece transport unit according to a fifth modified example.
Figure 24:
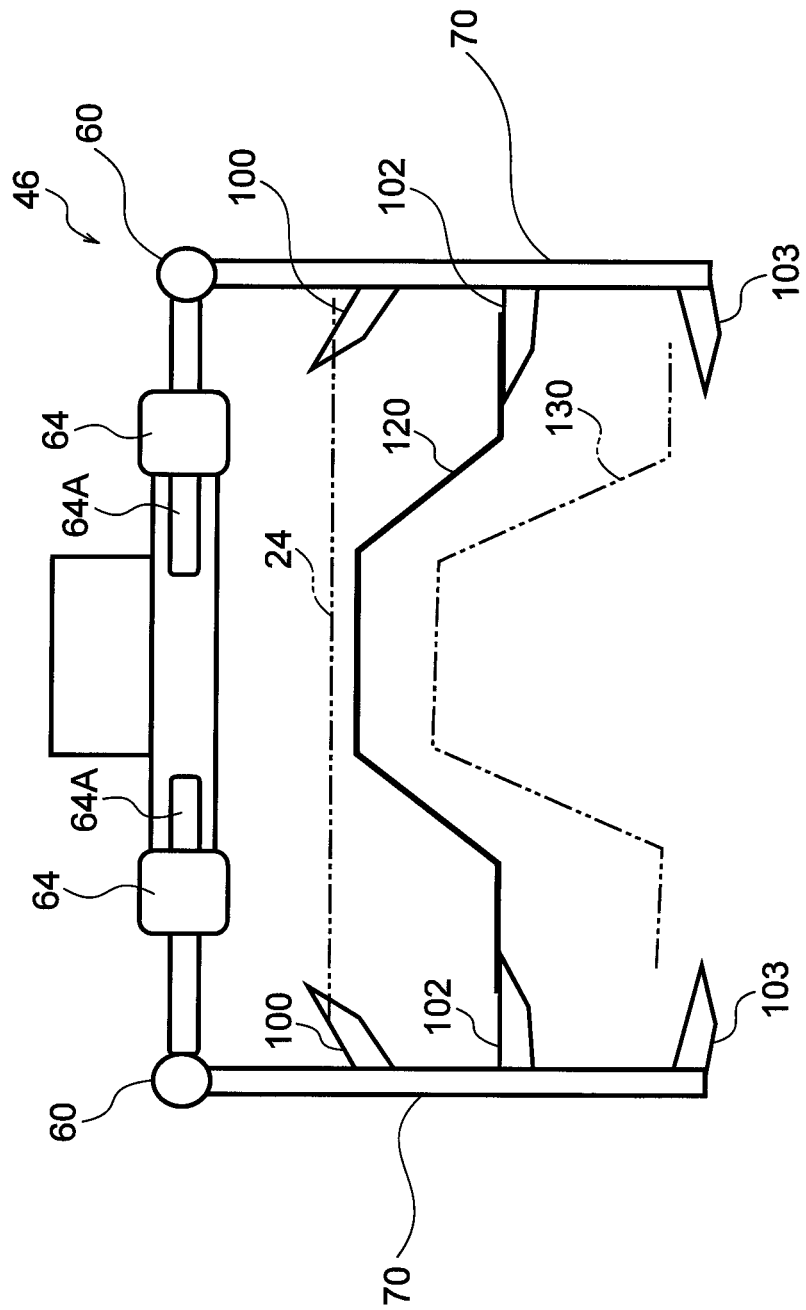
FIG. 24 is a front view illustrating a second example of operation of a workpiece transport unit according to the fifth modified example.

As illustrated in FIG. 23 to FIG. 25, each pair of arms 70 may be provided with the pair of first hooks 100 on which the blank 24 is placed, the pair of second hooks 102 on which the first-stage molded article 120 is placed, and a pair of third hooks 103 on which the second-stage molded article 130 is placed.

As illustrated in FIG. 23 to FIG. 25, the angle of incline and spacing between each pair of arms 70 may be controlled separately between cases in which the blank 24 is supported by the pair of first hooks 100, cases in which the first-stage molded article 120 is supported by the pair of second hooks 102, and cases in which the second-stage molded article 130 is supported between the pair of third hooks 103. Such a configuration enables the blank 24, the first-stage molded article 120, and the second-stage molded article 130 to be effectively supported by the first hooks 100, the second hooks 102, and the third hooks 103, thereby enabling a reduction in size of the second hooks 102 and the third hooks 103 and thus enabling a reduction in weight of the arms 70.

Moreover, such a configuration also enables the height of the workpiece transport unit 46 when supporting and transporting the blank 24 with the pairs of first hooks 100, the height of the workpiece transport unit 46 when supporting and transporting the first-stage molded article 120 with the pairs of second hooks 102, and the height of the workpiece transport unit 46 when supporting and transporting the second-stage molded article 130 with the pairs of third hooks 103 to be unified. This enables the frequency of raising and lowering of the workpiece transport unit 46 to be reduced.

Although explanation has been given regarding a first exemplary embodiment to a fifth exemplary embodiment of the present disclosure, the present disclosure is not limited to the above description, and obviously various modifications may be implemented within a range not departing from the spirit of the present disclosure.

The disclosure of Japanese Patent Application No. 2019-104321 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

EXPLANATION OF THE REFERENCE NUMERALS 10 hot pressing equipment
12 table
14 heating furnace
14A entrance/exit
16 transport table
16A side wall
16B groove
18 first press
20 second press
22 controller
24 blank
24A locating hole
26 roller
28 lower mold
30 base section
30A upper face
32 punch section
32A apex face
34 housing portion
36 lifter
36A body
36B locating pin
36C upper face
38 shaft
40 first manipulator
42 second manipulator
44 third manipulator
46 workpiece transport unit
48 base frame
48A length direction of widthwise member
50 lengthwise member
50A length direction of lengthwise member 50
52 widthwise member
52A central portion
52B extension/retraction mechanism
52C extension portion
54 coupling member
56 joint
60 rotation shaft
62 opening/closing mechanism
64 extension/retraction mechanism
64A slide shaft
68 axial direction
70 arm
78 width of arm
80 separation between rollers
82 width of groove
88 arm driver
88A actuation shaft
88B pin
90 link member
90A elongated hole
92 closed state
94 open state
100 first hook 100 A first placement surface
102 second hook
102A second placement surface
103 third hook
104 length dimension of first hook
106 length dimension of second hook
108 dimension from second placement surface to first placement surface
109 height direction
110 height dimension of apex face
112 height dimension of locating pin
120 first-stage molded article
130 second-stage molded article
140 transport table
142 top face
144 groove
146 width of groove
148 sensor
150 shape sensor
152 temperature sensor
154 guide

The invention claimed is:

1. A workpiece transport unit, comprising:
a pair of arms;
an opening/closing mechanism configured to open and close the pair of arms in a horizontal direction;
a pair of first placement surfaces provided at the pair of arms and configured for a first workpiece to be placed thereon; and
a pair of second placement surfaces provided at the pair of arms and configured for a second workpiece to be placed thereon, wherein:
a width of the second workpiece is narrower than a width of the first workpiece,
the workpiece transport unit further comprises, at the pair of arms, a pair of first hooks and a pair of second hooks,
the pair of first hooks include the pair of first placement surfaces,
the pair of second hooks include the pair of second placement surfaces,
when the pair of arms are in a closed state, each of the pair of first hooks and each of the pair of second hooks extend toward a side of an opposing arm of the pair of arms, which oppose each other in the horizontal direction,
the pair of first hooks are respectively provided between leading end portions and base end portions of the pair of arms,
the pair of second hooks are respectively provided at the leading end portions of the pair of arms, and
when the pair of arms are in a closed state, an interval between leading ends of the pair of first hooks is wider than an interval between leading ends of the pair of second hooks.

2. The workpiece transport unit of claim 1, wherein respective lengths of the pair of first hooks are different from respective lengths of the pair of second hooks.

3. The workpiece transport unit of claim 1, wherein the opening/closing mechanism includes a rotation shaft that swingably supports the pair of arms.

4. The workpiece transport unit of claim 1, wherein the opening/closing mechanism supports the pair of arms so as to be openable and closeable such that the pair of arms are configured to adopt a closed state in which the pair of arms extend in a vertical direction and oppose each other in the horizontal direction, and an open state in which the pair of arms extend in the horizontal direction.

5. The workpiece transport unit of claim 1, wherein the opening/closing mechanism includes an extension/retraction mechanism that supports the pair of arms so as to be slideable in the horizontal direction.

6. A hot pressing equipment, comprising:
the workpiece transport unit of claim 1;
a heating furnace;
a transport table connected to the heating furnace;
a first press configured to perform hot press forming on the first workpiece in order to form the second workpiece;
a second press configured to perform hot press forming on the second workpiece;
a manipulator configured to move the workpiece transport unit; and
a controller configured to control the opening/closing mechanism and the manipulator.

7. The hot pressing equipment of claim 6, wherein the controller is configured to control the manipulator such that a first height of the first workpiece when the first workpiece is being transported from the transport table to the first press is the same as a second height of the second workpiece when the second workpiece is being transported from the first press to the transport table.

8. The hot pressing equipment of claim 6, wherein the controller is configured to control the manipulator such that the workpiece transport unit is moved along a direction in which the pair of arms oppose each other when in the closed state in a case in which the workpiece transport unit moves to transport the first workpiece from the transport table to the first press, in a case in which the workpiece transport unit moves to transport the second workpiece from the first press to the transport table, and in a case in which the workpiece transport unit moves to transport the second workpiece from the transport table to the second press.

9. The hot pressing equipment of claim 6, wherein:
the first press and the second press each include a lower mold configuring a punch;
the lower mold includes a base section and a punch section projecting toward an upper side from an upper face of the base section; and
a height direction dimension from the upper face of the base section to an apex face of the punch section is smaller than a dimension between the first placement surface and the second placement surface.

10. The hot pressing equipment of claim 6, wherein:
the transport table includes a plurality of transport rolls; and
a width of each of the arms is narrower than an interval between the transport rolls.

11. The hot pressing equipment of claim 6, wherein:
the transport table includes a top face and a groove formed in the top face; and
a width of each of the arms is narrower than a width of the groove.

12. A workpiece transport method, comprising employing the workpiece transport unit of claim 1 to perform:
a first transport process of closing the pair of arms to achieve a state in which the first workpiece is placed on the pair of first placement surfaces and moving the workpiece transport unit so as to transport the first workpiece; and
a second transport process of closing the pair of arms to achieve a state in which the second workpiece is placed on the pair of second placement surfaces and moving the workpiece transport unit so as to transport the second workpiece.

13. A hot pressing method, comprising employing the hot pressing equipment of claim 6 to perform processing including:

a pre-heating transport process of closing the pair of arms to achieve a state in which a blank configuring the first workpiece is placed on the pair of first placement surfaces, moving the workpiece transport unit to above the transport table, and opening the pair of arms to place the blank on the transport table;

a first heating process of moving the blank that has been placed on the transport table into the heating furnace and then moving the blank from inside the heating furnace onto the transport table after heating the blank inside the heating furnace;

a post-first heating transport process of closing the pair of arms to achieve a state in which the blank is placed on the pair of first placement surfaces, moving the workpiece transport unit to above a lower mold of the first press, and opening the pair of arms so as to set the blank on the lower mold of the first press;

a first pressing process of hot press forming the blank between the lower mold and an upper mold of the first press to form the blank into a first-stage molded article configuring the second workpiece;

a post-first pressing transport process of closing the pair of arms to achieve a state in which the first-stage molded article is placed on the pair of second placement surfaces, moving the workpiece transport unit to above the transport table, and opening the pair of arms to place the first-stage molded article on the transport table;

a second heating process of moving the first-stage molded article that has been placed on the transport table into the heating furnace and then moving the first-stage molded article from inside the heating furnace onto the transport table after heating the first-stage molded article inside the heating furnace;

a post-second heating transport process of closing the pair of arms to achieve a state in which the first-stage molded article is placed on the pair of second placement surfaces, moving the workpiece transport unit to above a lower mold of the second press, and opening the pair of arms so as to set the first-stage molded article on the lower mold of the second press; and a second pressing process of hot press forming the first-stage molded article between the lower mold and an upper mold of the second press to form the first-stage molded article into a second-stage molded article configuring the second workpiece.

\* \* \* \* \*